United States Patent [19]

Moser et al.

[11] Patent Number: 5,001,226
[45] Date of Patent: Mar. 19, 1991

[54] METAL-FREE DISAZO AND POLYAZO COMPOUNDS HAVING AT LEAST ONE 6-HYDROXYPYRID-2-ONE COUPLING COMPONENT RADICAL LINKED TO A 1-AMINO- OR HYDROXY-3-AMINO- OR HYDROXYBENZENE COUPLING COMPONENT RADICAL AND METAL COMPLEXES THEREOF

[75] Inventors: Helmut A. Moser, Oberwi, Switzerland; Roland Wald, Huningue, France

[73] Assignee: Sandoz Ltd., Basel, Switzerland

[21] Appl. No.: 452,878

[22] Filed: Dec. 19, 1989

Related U.S. Application Data

[63] Continuation of Ser. No. 270,937, Nov. 14, 1988, abandoned, which is a continuation-in-part of Ser. No. 50,182, May 14, 1987, abandoned.

[30] Foreign Application Priority Data

May 14, 1986 [DE] Fed. Rep. of Germany ....... 3616264
Jan. 23, 1987 [DE] Fed. Rep. of Germany ....... 3701855

[51] Int. Cl.[5] ................... C09B 44/08; C09B 45/24; C09B 35/037; D06P 1/41
[52] U.S. Cl. ................... 534/606; 534/573; 534/581; 534/582; 534/599; 534/602; 534/604; 534/605; 534/683; 534/684; 534/685; 534/686; 534/688
[58] Field of Search ............... 534/605, 606, 708, 709, 534/755, 757, 684, 685, 686, 688

[56] References Cited

U.S. PATENT DOCUMENTS

| | | | |
|---|---|---|---|
| 3,619,112 | 11/1971 | Berrie et al. | 534/757 X |
| 3,852,261 | 12/1974 | Steinemann | 534/606 |
| 4,213,897 | 7/1980 | Moser et al. | 534/606 |
| 4,468,347 | 8/1984 | Doswald et al. | 534/606 |
| 4,587,292 | 5/1986 | Doswald et al. | 534/605 X |
| 4,591,635 | 5/1986 | Greve et al. | 534/605 X |
| 4,742,161 | 5/1988 | Dore | 534/755 X |

FOREIGN PATENT DOCUMENTS

| | | | |
|---|---|---|---|
| 601433 | 7/1978 | Switzerland | 534/606 |
| 1296857 | 11/1972 | United Kingdom | |
| 2173210 | 10/1986 | United Kingdom | 534/606 |
| 2190392 | 11/1987 | United Kingdom | 534/757 |

*Primary Examiner*—Floyd D. Higel
*Assistant Examiner*—Fiona T. Powers
*Attorney, Agent, or Firm*—Gerald D. Sharkin; Richard E. Vila; Melvyn M. Kassenoff

[57] ABSTRACT

Compounds of the formula

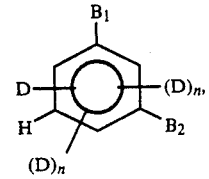

1:1 and 1:2 metal complexes thereof, salts of such compounds and metal complexes and mixture thereof, wherein
each of $B_1$ and $B_2$ is independently hydroxy or amino,
each D is independently

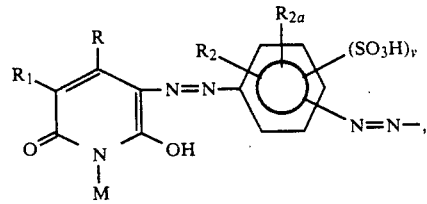

wherein
R is hydrogen, $C_{1-4}$alkyl, $C_{5-6}$cycloalkyl, phenyl, benzyl or phenylethyl,
$R_1$ is hydrogen, cyano, —COOR$_4$, —CONR$_5$R$_6$, —SO$_2$NR$_5$R$_6$,

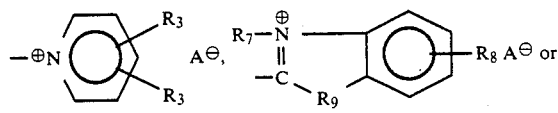

wherein
each $R_3$ is independently hydrogen, $C_{1-4}$alkyl, —NR$_5$R$_6$ or —CONR$_5$R$_6$,
$R_4$ is $C_{1-6}$alkyl or phenyl($C_{1-3}$alkyl),
$R_7$ is $C_{1-4}$alkyl,
$R_8$ is hydrogen or $C_{1-4}$alkyl, and
$R_9$ is —S—, —O— or —NR$_5$—,
$R_2$ is hydrogen, hydroxy or $C_{1-4}$alkoxy,
$R_{2a}$ is hydrogen, $C_{1-4}$alkyl or halo,
M is hydrogen; $C_{1-8}$alkyl; ($C_{1-4}$ alkoxy)$C_{1-4}$alkyl; $C_{2-4}$hydroxyalkyl; $C_{5-6}$cycloalkyl; $C_{5-6}$cycloalkyl substituted by 1 to 3 $C_{1-4}$alkyls; phenyl($C_{1-3}$alkyl); phenyl ($C_{1-3}$alkyl) the phenyl group of which is substituted by 1 to 3 $C_{1-4}$alkyls; —NR$_{11}$R$_{12}$; —A$_1$—NR$_{13}$R$_{14}$; —A$_2$—N$^{\oplus}$R$_{13}$R$_{14}$R$_{15}$A$^{\ominus}$ or (Abstract continued on next page.)

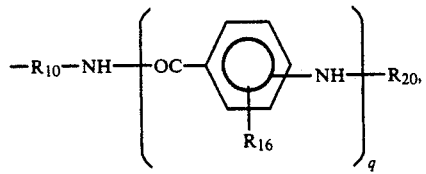

wherein
- $A_1$ is $C_{1-6}$alkylene or $C_{2-6}$alkenylene,
- $A_2$ is $C_{2-6}$alkylene or $C_{2-6}$alkenylene,
- $R_{10}$ is $C_{1-10}$alkylene; $C_{2-10}$alkenylene; alkylene or alkenylene having a maximum of 10 carbon atoms and interrupted by 1 or 2 atoms selected from oxygen and nitrogen; phenylene; or cyclohexylene,
- $R_{16}$ is hydrogen, halo, nitro, $C_{1-4}$alkyl or $C_{1-4}$alkoxy,
- $R_{20}$ is hydrogen, $-CO-(CH_2)_m-NR_{11}R_{12}$, $-CO-(CH_2)_m-N^{\oplus}R_{13}R_{14}R_{15}A^{\ominus}$ or

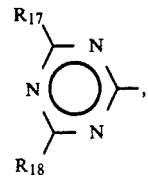

wherein m is 1 to 6, with the proviso that $R_{20}$ is other than hydrogen when g is 0, and
- q is 0 or 1,
- v is 0, 1 or 2, and
- each n is independently 0 or 1, are basic dyes useful for dyeing and printing paper, leather and textile substrates.

19 Claims, No Drawings

METAL-FREE DISAZO AND POLYAZO COMPOUNDS HAVING AT LEAST ONE 6-HYDROXYPYRID-2-ONE COUPLING COMPONENT RADICAL LINKED TO A 1-AMINO- OR HYDROXY-3-AMINO- OR HYDROXYBENZENE COUPLING COMPONENT RADICAL AND METAL COMPLEXES THEREOF

This is a continuation of application Ser. No. 07/270,937, filed Nov. 14, 1988 and now abandoned, which is a continuation-in-part of application Ser. No. 07/050,182, filed May 14, 1987 and now abandoned.

The invention relates to basic compounds useful for dyeing or printing substrates such as paper, textile and leather.

According to the invention, there is provided compounds of formula I

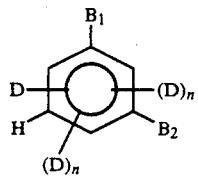

or salts thereof, in which
each n, independently is 0 or 1,
each of $B_1$ and $B_2$, independently is —OH or —NH$_2$, and
each D, independently, is a radical of formula II

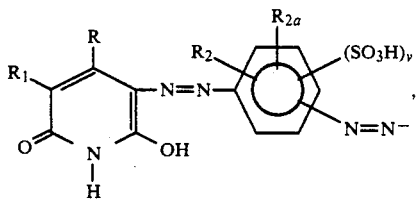

in which
each v, independently, is 0, 1 or 2;
each R, independently, is hydrogen, $C_{1-4}$alkyl, $C_{5-6}$cycloalkyl, phenyl, benzyl or phenylethyl,
each $R_1$, independently, is hydrogen, —CN, —COOR$_4$, —CONR$_5$R$_6$, —SO$_2$NR$_5$R$_6$,

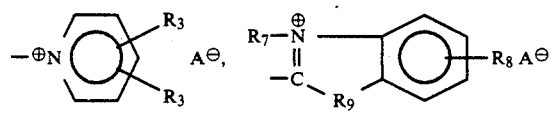

or

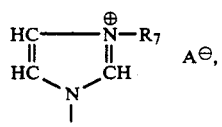

in which
each $R_3$, independently, is hydrogen $C_{1-4}$alkyl, —NR$_5$R$_6$ or —CONR$_5$R$_6$;
each $R_4$, independently, is $C_{1-6}$alkyl or phenyl-($C_{1-3}$alkyl);
each of $R_5$ and $R_6$, independently, is hydrogen or $C_{1-4}$alkyl or, independently, $R_5$ and $R_6$ together with the N-atom to which they are attached form a saturated ring which contains one to three hetero atoms and is unsubstituted or substituted by one to three $C_{1-4}$alkyl;
each $R_7$, independently, is $C_{1-4}$alkyl;
each $R_8$, independently, is hydrogen or $C_{1-4}$alkyl; and
each $R_9$, independently, is —S—, —O— or

each $R_2$, independently, is hydrogen, hydroxy or $C_{1-4}$alkoxy;
each $R_{2a}$, independently, is halo, hydrogen or $C_{1-4}$alkyl, and
each M, independently, is hydrogen; $C_{1-8}$alkyl; ($C_{1-4}$alkoxy)$C_{1-4}$alkyl; $C_{2-4}$hydroxyalkyl; $C_{5-6}$cycloalkyl; $C_{5-6}$cycloalkyl substituted by 1 to 3 $C_{1-4}$alkyl groups; phenyl-($C_{1-3}$alkyl); phenyl-($C_{1-3}$alkyl) the phenyl group of which is substituted by 1 to 3 $C_{1-4}$alkyl; —NR$_{11}$R$_{12}$; —A$_1$—NR$_{13}$R$_{14}$; —A$_2$⊕R$_{13}$R$_{14}$R$_{15}$ A⊖ or —R$_{10}$—NH—R$_o$;
in which each $A_1$, independently, is linear or branched $C_{1-6}$alkylene or linear or branched $C_{2-6}$alkenylene;
each $A_2$, independently, is linear or branched $C_{2-6}$alkylene or linear or branched $C_{2-6}$alkenylene;
each $R_{10}$, independently is linear or branched $C_{1-10}$alkylene; linear or branched alkylene having a maximum or ten carbon atoms and interrupted by one or two hetero atoms selected from oxygen and nitrogen: linear or branched $C_{2-10}$alkenylene; linear or branched alkenylene having a maximum of ten carbon atoms and interrupted by one or two hetero atoms selected from oxygen and nitrogen; phenylene; or cyclohexylene;
each of $R_{11}$ and $R_{12}$, independently, is hydrogen; $C_{1-6}$alkyl; $C_{2-6}$alkyl monosubstituted by halo, hydroxy or cyano; phenyl($C_{1-3}$alkyl); phenyl($C_{1-3}$alkyl) the phenyl group of which is substituted by 1 to 3 substituents selected from halo, $C_{1-4}$alkyl and $C_{1-4}$alkyloxy; $C_{5-6}$cycloalkyl; $C_{5-6}$cycloalkyl substituted by 1 to 3 $C_{1-4}$alkyl or, independently, $R_{11}$ and $R_{12}$ together with the N-atom to which they are attached form a saturated ring which contains one to three hetero atoms and is unsubstituted or substituted by one to three $C_{1-4}$alkyl;
each of $R_{13}$ and $R_{14}$, independently, have one of the significances given above for $R_{11}$ and $R_{12}$, including, the heterocyclic significances;
each $R_{15}$, independently, is $C_{1-4}$alkyl or phenyl($C_{1-4}$alkyl),
or $R_{13}$, $R_{14}$ and $R_{15}$ together with the N-atom to which they are attached form a pyridinium ring or a pyridinium ring substituted by 1, 2 or 3 $C_{1-4}$alkyl;
each $R_o$, independently, is

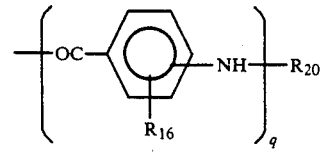

in which
q is 0 or 1,
$R_{16}$ is hydrogen, halo, nitro, $C_{1-4}$alkyl or $C_{1-4}$alkoxy, and
each $R_{20}$, independently, is hydrogen, $-CO-(CH_2)_m-Z$ or

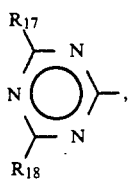

with the proviso that $R_{20}$ is other than hydrogen when q is 0, in which each m, independently, is 1 to 6, each Z, independently, is $-NR_{11}R_{12}$ or $-N^{\oplus}R_{13}R_{14}R_{15} A^{\ominus}$;

each $R_{17}$, independently, is halo, hydroxy, $C_{1-4}$alkoxy, phenyl, amino or an aliphatic, cycloaliphatic, aromatic or heterocyclic amino group the nitrogen atom of which is attached to the 1,3,5-triazine ring, each $R_{18}$, independently, is an aliphatic, cycloaliphatic, aromatic or heterocyclic amino group the nitrogen atom of which is attached to the 1,3,5-triazine ring, and each $A^{\ominus}$ is independently a non-chromophoric anion, comprising (a) metal-free compounds of formula I and salts thereof wherein, independently,
  (1) at least one n is 1,
  (2) at least one v is 1,
  (3) at least one $R_2$ is hydroxy or $C_{1-4}$alkoxy, or
  (4) at least one $R_{2a}$ is halo;
(b$_1$) 1:1 metal complexes of metallizable compounds of formula I and salts thereof;
(b$_2$) 1:2 metal complexes of metallizable compounds of formula I and salts thereof containing two identical or different metallizable compounds of formula I or one metallizable compound of formula I and one metallizable compound not of said formula; and
(c) mixtures of (a) and/or (b$_1$) and/or (b$_2$);
with the provisos that
  (1) when the compound of formula I is free from sulpho groups, it contains at least one water-solubilising protonatable basic or cationic group, and
  (2) when the compound of formula I contains at least one sulpho group the total number of water-solubilising protonatable basic and cationic groups exceeds the number of sulpho groups present in the compound of formula I by at least one.

"Halo" means fluoro, chloro, bromo or iodo, preferably chloro or bromo, particularly chloro.

The term "basic group" includes protonatable primary, secondary and tertiary amino groups.

Where any symbol appears more than once in a formula, unless indicated to the contrary, its significances are independent of one another whether or not the word "independently" is indicated.

The nitrogen atom of the $-NR_{13}R_{14}$ group is preferably separated from the nitrogen atom of the pyridone ring by at least two carbon atoms.

Any aliphatic amino group is preferably a mono-$C_{1-4}$alkyl- or a di-($C_{1-4}$alkyl)-amino or hydrazino group. The alkyl group may be substituted by 1 to 3 groups selected from halogen, phenyl, hydroxy and $C_{5-6}$cycloalkyl.

Any cycloaliphatic amino group present is preferably $C_{5-6}$cycloalkylamino, the cycloalkyl group of which may be substituted by one or two $C_{1-2}$alkyl groups.

Any aromatic amino group present is preferably anilino, the phenyl ring of which is unsubstituted or substituted by one to three substituents selected from $C_{1-4}$alkyl, $C_{1-4}$alkoxy, halogen, hydroxy and phenoxy.

Any heterocyclic amino present is preferably derived from pyridine, triazine, pyridazine, pyrimidine or pyrazine (when unsaturated) and morpholine, pyrrolidine, piperidine, piperazine of N-methylpiperazino (when saturated).

Preferably, at least one n is 1; more preferably, just one n is 1.

Preferably, each v is 0.

Preferably, each $R_{2a}$ is hydrogen.

R is preferably R', where R' is methyl, ethyl, phenyl, benzyl or cyclohexyl. More preferably R is R'' where R'' is methyl or phenyl especially methyl.

$R_1$ is preferably $R_1'$, where $R_1'$ is hydrogen, cyano, $-CONR_5'R_6'$ or

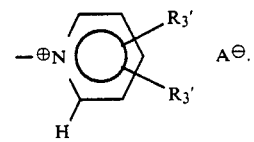

More preferably $R_1$ is $R_1''$, where $R_1''$ is hydrogen, cyano or

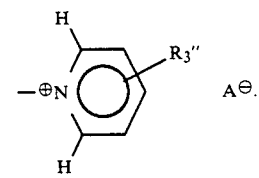

$R_2$ is preferably $R_2'$, where $R_2'$ is hydrogen, hydroxy or methoxy. $R_2$ is preferably ortho to the pyridone-azo group. More preferably, each $R_2$ is hydrogen.

$R_3'$ is preferably $R_3'$, where $R_3'$ is hydrogen, methyl ethyl, amino or dimethylamino. More preferably $R_3$ is $R_3''$, where $R_3''$ is hydrogen or methyl.

$R_5$ is preferably $R_5'$, where $R_5'$, is hydrogen, methyl or ethyl. More preferably $R_5$ is $R_5''$, where $R_5''$ is hydrogen or methyl.

$R_6$ is preferably $R_6'$, where $R_6'$ has one of the significances of $R_5'$, independently thereof.

$R_5'$ and $R_6'$ together with the nitrogen atom to which they are attached may also form a pyrrolidinyl, morpholino, piperidino, piperazinyl or N-($C_{1-4}$alkyl)-piperazinyl radical.

$R_{10}$ is preferably $R_{10}'$, where $R_{10}'$ is linear or branched $C_{1-8}$alkylene or meta- or para-phenylene. More preferably $R_{10}$ is $R_{10}''$, where $R_{10}''$ is 1,2-ethylene, 1,3-propylene or meta- or para-phenylene.

$R_{11}$ is preferably $R_{11}'$, where $R_{11}'$ is hydrogen, linear or branched $C_{1-6}$alkyl, linear $C_{2-3}$hydroxyalkyl, benzyl, 2-cyanoethyl or 2-chloroethyl. $R_{11}$ is preferably $R_{11}''$, where $R_{11}''$ is hydrogen, methyl or ethyl.

$R_{12}$ is preferably $R_{12}'$, where $R_{12}'$ has one of the significances of $R_{11}'$, independently. More preferably $R_{12}$ is $R_{12}''$, where $R_{12}''$ has one of the significances of $R_{11}''$, independently thereof.

$R_{11}'$ and $R_{12}'$ together with the nitrogen atom to which they are attached may also form a pyrrolidinyl, morpholino, piperidino, piperazino or N-($C_{1-4}$alkyl)-piperazino radical.

$R_{11}''$ and $R_{12}''$ together with the nitrogen atom to which they are attached may also form a morpholino, piperazino or N-methyl-piperazino.

$R_{13}$ is preferably $R_{13}'$, where $R_{13}'$ is linear or branched $C_{1-6}$alkyl, linear $C_{2-3}$hydroxyalkyl, benzyl, 2-cyanoethyl or 2-chloroethyl. More preferably $R_{13}$ is $R_{13}''$, where $R_{13}''$ is methyl or ethyl.

$R_{14}$ is preferably $R_{14}'$, where $R_{14}'$ has one of the significances of $R_{13}'$, independently. More preferably $R_{14}$ is $R_{14}''$, where $R_{14}''$ has one of the significances of $R_{13}''$, independently thereof.

$R_{15}$ is preferably $R_{15}'$, where $R_{15}'$ is methyl, ethyl, propyl or benzyl. More preferably, $R_{15}$ is $R_{15}''$, where $R_{15}''$ is methyl, ethyl or benzyl.

$R_{13}'$, $R_{14}'$ and $R_{15}'$ together with the nitrogen atom to which they are attached may also form a pyridinium ring unsubstituted or substituted by one or two methyl groups or a radical $\beta$

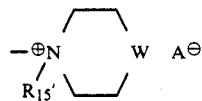

in which W is a direct bond, —$CH_2$—, —O—, —S—, —$SO_2$—, —SO—, —NH—, >$^{\oplus}N(R_{15}')_2$ $A^{\ominus}$ or >N—$R_{50}$ in which $R_{50}$ is benzyl, $C_{1-4}$alkyl or $C_{1-4}$alkyl substituted by amino.

$R_{13}''$, $R_{14}''$ and $R_{15}''$ together with the nitrogen atom to which they are attached may also form a pyridinium, 2- or 3-picolinium, N-methylmorpholinium, N-methylpiperidinium, N-methylpiperazinium of N,N'=dimethyl-piperazinium ring.

M is preferably M', where M' is hydrogen, methyl, ethyl, 2-hydroxyethyl, 2-methoxyethyl, 2-ethoxyethyl, cyclohexyl, benzyl, —$CH_2$—$NR_{13}'R_{14}'$, —($CH_2$)$_2$—$NR_{13}'R_{14}'$, —($CH_2$)$_3$—$NR_{13}'R_{14}'$, —($CH_2$)$_2$$N^{\oplus}R_{13}'R_{14}'R_{15}'$ $A^{\ominus}$, —($CH_2$)$_3$—$^{\oplus}NR_{13}'R_{14}'R_{15}'$ $A^{\ominus}$ or —$R_{10}'$—NH—$R_o'$. Preferably M is M'', where is ethyl, )$_2$—$NR_{13}''R_{14}''$, —($CH_2$)$_3$—$NR_{13}''R_{14}''$, —($CH_2$)$_2$$^{\oplus}NR_{13}''R_{14}R_{15}''$ $A^{\ominus}$, —($CH_2$)$_3$—$N^{\oplus}R_{13}''R_{14}''R_{15}''$ $A^{\ominus}$ or —$R_{10}''$—NH—$R_o''$.

$R_o$ is preferably $R_o'$, where $R_o'$ is a radical

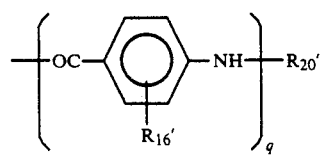

More preferably $R_o$ is $R_o''$, where $R_o''$ is a radical

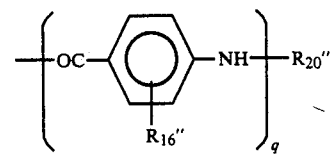

$R_{16}$ is preferably $R_{16}'$, where $R_{16}'$ is hydrogen, chloro, nitro, methyl or methoxy. More preferably $R_{16}$ is $R_{16}''$ where $R_{16}''$ is hydrogen, chloro or methyl.

$R_{20}$ is preferably $R_{20}'$, where $R_{20}'$ is hydrogen,

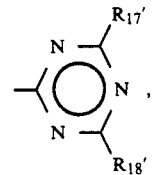

—CO—$CH_2$—$Z_1$ or —CO—$CH_2$—$CH_2$—$Z_1$, in which each $Z_1$, independently, is —$NR_{11}'R_{12}'$ or —$^{\oplus}NR_{13}'R_{14}'R_{15}'$ $A^{\ominus}$.

More preferably $R_{20}$ is $R_{20}''$, where $R_{20}''$ is hydrogen,

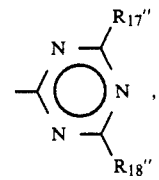

or —CO—$CH_2$—$Z_2$, in which $Z_2$ is —$NR_{11}''R_{12}''$ or —$^{\oplus}NR_{13}''R_{14}''R_{15}''$ $A^{\ominus}$.

$R_{17}$ is preferably $R_{17}'$, where $R_{17}'$ is chloro, hydroxy, amino, methoxy, bis[hydroxy-$C_{2-4}$alkyl]-amino,

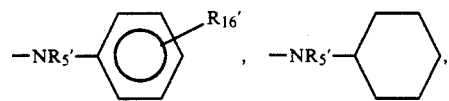

in which $R_{19}$ is $C_{1-12}$alkyl; $C_{1-12}$alkyl substituted by hydroxy; alkyl having a maximum of 12 cabon atoms which is interrupted by 1 to 3 radicals selected from —$NR_5'$— and

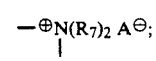

alkyl having a maximum of 12 carbon atoms which is substituted by hydroxy and interrupted by 1 to 3 radicals selected from —$NR_5'$— and

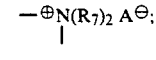

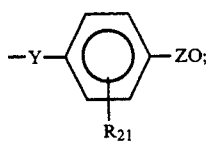

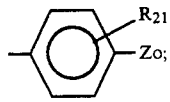

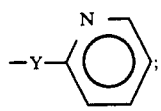

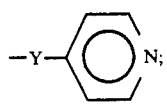

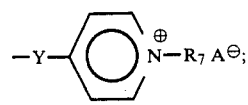

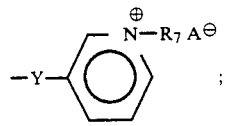

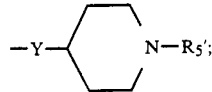

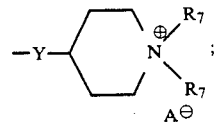

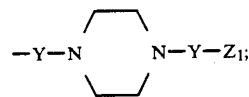

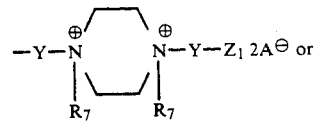

in which $R_{21}$ is halo, hydroxy, nitro, $C_{1-4}$alkyl, $C_{1-4}$alkoxy or hydrogen, and $Z_o$ is —N(CH$_3$)$_2$, —N(C$_2$H$_5$)$_2$, —$\oplus$N(CH$_3$)$_3$ A$^\ominus$, —$\oplus$N(C$_2$H$_5$)$_3$ A$^\ominus$, —CO—Y$_o$—Z$_1$, —NH-CO—Y$_o$—Z$_1$, —CONH—Y$_o$—Z$_1$, —SO$_2$—NH—Y$_o$—Z$_1$, —Y$_o$—Z$_1$ or —NHNHCO—CH$_2$—Z$_1$ and each Y, independently, is linear or branched $C_{1-8}$alkylene or linear or branched $C_{3-8}$alkenylene, each $Y_2$, independently, is linear $C_{1-6}$alkylene, and each $Y_0$ independently, is linear or branched $C_{1-4}$alkylene, and $R_{51}$ is hydrogen, $C_{1-4}$alkyl or $C_{1-4}$alkyl substituted by amino.

More preferably $R_{17}$ is $R_{17}''$, where $R_{17}''$ is chloro, hydroxy, amino, methoxy, mono-$C_{1-2}$alkylamino, mono-hydroxy-$C_{2-4}$alkylamino, bis[hydroxy-$C_{2-4}$alkyl]-amino,

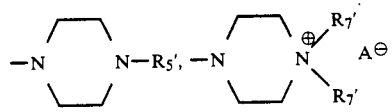

in which each $R_7'$, independently, is methyl or ethyl, and $R_{19}'$ is —(CH$_2$)$_a$—NR$_5''$—CH$_3$, —(CH$_2$)$_a$—NR$_5''$—(CH$_2$)$_a$—NR$_5''$C$_2$H$_5$, —(CH$_2$)$_a$N$\oplus$(R$_{13}''$)$_2$—(CH$_2$)$_a$—N$\oplus$(R$_{13}''$)$_2$—C$_2$H$_5$ 2A$^\ominus$, —(CH$_2$)$_a$—NR$_5''$—C$_2$H$_5$, —(CH$_2$)$_a$—$\oplus$N(R$_{13}''$)$_2$C$_2$H$_5$ A$^\ominus$, —NHCO—CH$_2$—Z$_2$, —CH$_2$—CO—NH—Y'—Z$_2$, —Y'—Z$_2'$,

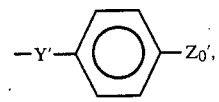

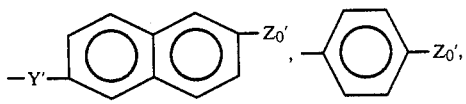

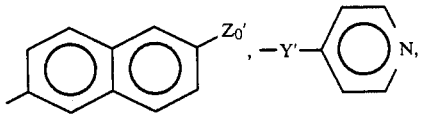

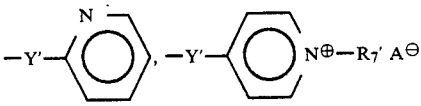

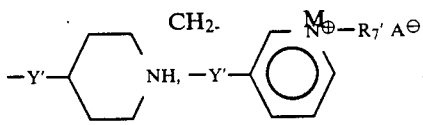

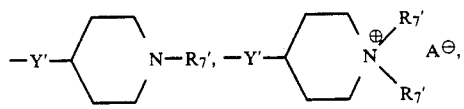

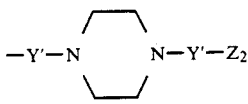

-continued

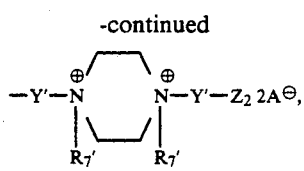

in which
each $Z_o'$ independently, is $-N(CH_3)_2$; $-^\oplus N(CH_3)_3 A^\ominus$; $-CONH-Y_o'-Z_2$; $-NHCO-Y_o'-Z_2$; $-CO-Y_o'-Z_2$; $-SO_2NH-Y_o'-Z_2$; $-Y_o'-Z_2$ or $-NHNH-COCH_2-Z_2$;

each $Y'$, independently, is linear or branched $C_{1-4}$alkylene;

each $Y_o'$, independently, is linear or branched $C_{2-4}$alkylene, and a is 2 or 3.

$R_{18}$ is preferably $R_{18}'$, where $R_{18}'$ is $-NR_5'R_{19}$ in which $R_5'$ and $R_{19}$ are as defined above. More preferably $R_{18}$ is $R_{18}''$, where $R_{18}''$ is $-NR_5''R_{19}'$ in which $R_5''$ and $R_{19}'$ are as defined above.

D is preferably D', where D' is a radical of formula IIa

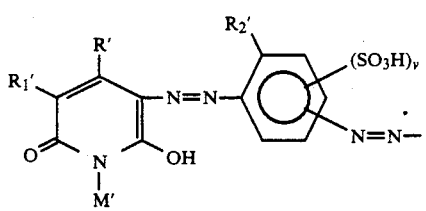

More preferably D is D'' where D'' is a radical of formula IIb

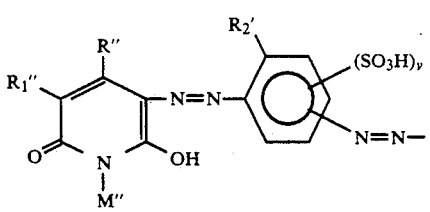

In formulae IIa and IIb, v is preferably 0.

Preferred compounds of formula I are those in free form or salt form and in metal-free, 1:1 or 1:2 metal complex form, of formula Ia

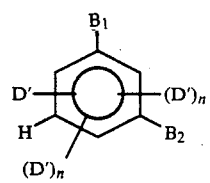

in which $B_1$, $B_2$, D' and n are as defined above, with the provisos (1) and (2) as indicated above.

In the compounds of formula Ia, the symbols D' are preferably distinct from each other. More preferably, at least one n is 1 and each v is 0. Most preferably, just one n is 1, and, when the compounds are in metal-free form, each $R_2'$ is hydrogen.

More preferred compounds of formula I are those, in free form or salt form and in metal-free, 1:1 or 1:2 metal complex form, of formula Ib

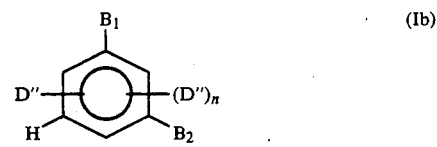

in which $B_1$, $B_2$, D'' and n are as defined above, with the provisos (1) and (2) as indicated above.

In the compounds of formula Ib, the symbols D'' are preferably distinct from each other. More preferably, n is 1, and each v is 0. Most preferably, when the compounds are in metal-free form, each $R_2'$ is hydrogen.

Interesting compounds of formula I in 1:1 metal complex form and in free form or salt form are of formula III

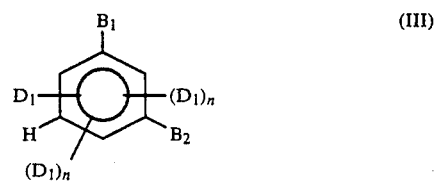

in which $B_1$, $B_2$ and n are as defined above and each $D_1$, independently, is a radical of formula IIc

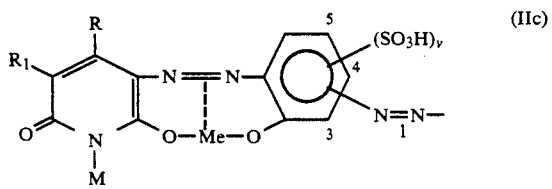

in which R, $R_1$, M and v are as defined above, the azo group is fixed in the position 3, 4 or 5 and Me is copper, chromium, cobalt, nickel or manganese.

Preferred compounds of formula I in 1:1 metal complex form and in free form or salt form are of formula IIIa

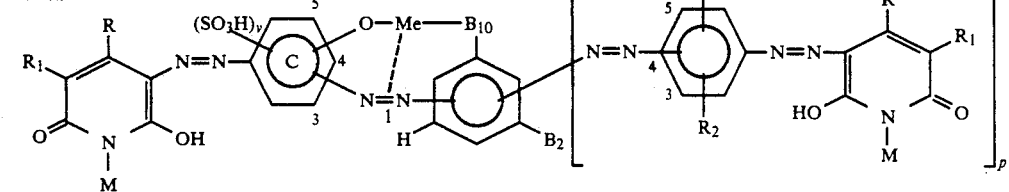

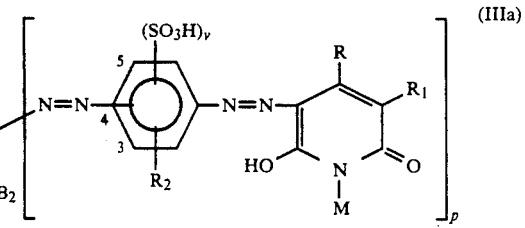

in which $B_2$, R, $R_1$, $R_2$, M, Me and v are as defined above, p is 0, 1 or 2, $B_{10}$ is $-O-$ or $-NH-$, the azo group and the —O—Me—B₁₀ radical being in the position ortho to each other on ring C and the radical —O—Me—Be₁₀ being located on ring C in the position 3 or 4.

Further preferred compounds of formula I in 1:1 metal complex form and in free form or salt form are those of formula IIIb

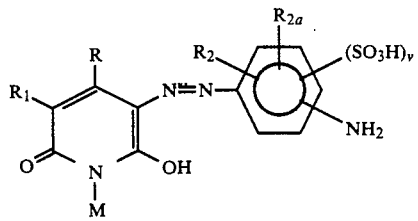

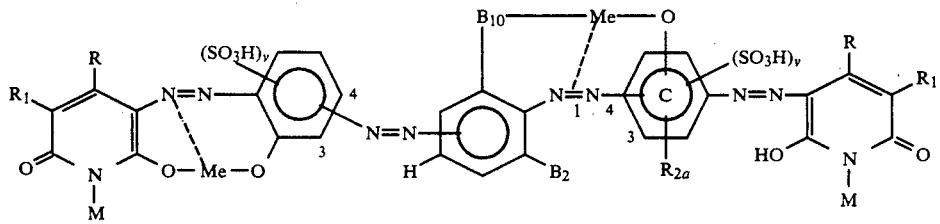

in which B₂, B₁₀, R, R₁, M, Me and v are as defined above, the azo group and the —O—Me—Be₁₀ being in the position ortho to each other on the ring C and the radical —O—Me—B₁₀ being located on ring C in position 3 or 4.

When the compounds of formula I are in the form of a 1:2 metal complex, the metal Me is chromium, cobalt or iron and bound as indicated in the formulae III, IIIa and IIIb but together with a second identical or different molecule of dyestuff of formula I or with another metallisable organic compound. The negative charge of the complexed metal ion of each 1:2 complex is balanced by hydrogen or a preferably monovalent, non-chromophoric cation, for example, lithium, sodium, potassium or ammonium.

The term "salt form" includes acid addition salts (wherein, for example, one or more basic non-cationic groups are in the form of acid addition salts with, for example, a non-chromophoric acid HA, HA being an acid corresponding to A⊖, as defined and exemplified herein), salts wherein one or more acidic (e.g., sulpho) groups are in salt form (with, for example, a non-chromophoric cation such as lithium, sodium, potassium or ammonium) and internal salts (wherein, for example, the negative charge of at least one sulpho group is balanced by a cationic group of the molecule (as in Examples 72 to 137 for example).

In the compounds of formula I the anions A⊖ can be any non-chromophoric anions such as those conventional in basic dyestuff chemistry. Suitable anions include chloride, bromide, sulphate, bisulphate, methylsulphate, aminosulphonate, perchlorate, benzenesulphonate, oxalate, maleate, acetate, propionate, lactate, succinate, tartrate, malate, methanesulphonate and benzoate as well as complex anions, for example zinc chloride double salts and anions of boric acid, citric acid, glycollic acid, diglycollic acid and adipic acid or addition products of ortho boric acids with polyalcohols with at least one cis diol group present. These anions can be exchanged for each other by ion exchange resins on reaction with acids or salts (for example via the hydroxide or bicarbonate) or according to German Offenlegungsschrift 2,001,748 or 2,002,816.

Further, according to the invention there is provided a process for preparing a compound of formula I comprising reacting 1 to 3 moles of a diazotised compound of formula IV

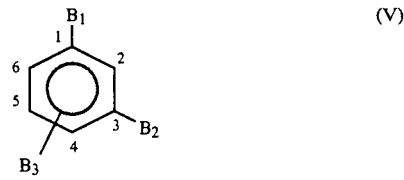

in which R, R₁, R₂, R₂ₐ, M and v are as defined above, with 1 mole of a compound of formula V $$\underset{B_3}{\underset{|}{\underset{5\phantom{xx}4}{\overset{6\phantom{xx}2}{\underset{\phantom{x}}{\bigcirc}}}}}\overset{B_1}{\underset{1}{\phantom{x}}}\phantom{xx}3-B_2 \qquad (V)$$

in which B₁ and B₂ are as defined above and B₃ is hydrogen or —CH₂OH, and, if required, the resulting compounds of formula I may be converted into the corresponding 1:1 or 1:2 metal complex form and/or into the corresponding salt form.

Compounds of formulae IV and V are known or may be made by known methods from known compounds.

Coupling to form compounds of formula I can be carried out according to known methods. Advantageously, coupling is carried out in aqueous (acid, neutral or alkali) medium at a temperature from −10° C. to room temperature, if necessary, in the presence of a coupling accelerator such as pyridine or urea. Alternatively, coupling may be effected in a mixture of solvents, for example, water and an organic solvent. When B₃ is —CH₂OH, this group is cleaved in the coupling reaction. The most preferred coupling positions are the 4- and 6-positions of the compound of formula V followed by the 2-position. The compounds of formula I are usually obtained as a mixture of position isomers and used as such. However, if desired, the obtained mixtures may be separated by known methods to obtain single compounds.

Metallisation of the compounds of formula I can be achieved by known methods.

The compounds of formula I in 1:1 metal complex form may be prepared by metallising compounds of formula I in metal-free form with a metal selected from copper, cobalt, nickel, manganese and chromium.

A compound of formula I in 1:2 metal complex form may be prepared by reacting a compound of formula I or other than of formula I in metal-free form with a 1:1 metal complex of formula I when the metal is chromium, cobalt or iron.

The metallisation process to form a 1:1 metal complex of the type of formula IIIa, IIIb or III is advantageously carried out by treating 1 mole of a compound with a metallising agent containing 1, respectively 2, respectively 3 equivalents of metal.

1:1 Metal complex formation using copper can be carried out by directly reacting a compound of formula I with a metal salt or by oxidative coppering preferably at 40°-70° C. and at a pH of 4-7 in the presence of a Cu(II) salt or with copper filings in the presence of $H_2O_2$ or any other oxidizing agent; or demethylating coppering can be applied in a pH range of 3-4 at a high temperature.

Metallisation is carried out advantageously in aqueous medium or in a mixture of water and a water-miscible organic solvent, for example acetone, lower alkyl alcohols, dimethylformamide, formamide, glycols or acetic acid at a pH range from 1.0 to 8.0, preferably pH 2 to 7. The metallisation process may be carried out at a temperature from room temperature to the boiling point of the reaction medium.

Alternatively, metallisation may be effected in a wholly organic medium (for example dimethylformamide). Advantageously, for instance, cobaltisation may be carried out in the presence of an inorganic nitrite such as lithium, sodium, ammonium or potassium nitrite in the ratio of 2 to 6 moles of nitrite per gram atom of cobalt.

Suitable cobalt-yielding compounds are, for example, cobalt(II) and Co(III) sulphate, acetate, formate and chloride.

Copper-yielding compounds are, for example, cupric sulphate, cupric formate, cupric acetate and cupric chloride.

The nickel-yielding compounds are Ni(II) and Ni(III) compounds, such as nickel formate, nickel acetate and nickel sulphate.

Preferred manganese-yielding compounds are Mn(II) compounds and iron-yielding compounds are Fe(II) and Fe(III) compounds. Examples of these are manganese and iron formate, acetate and sulphate.

Preferred chromium-yielding compounds are Cr(II) and Cr(III) formate, acetate and sulphate.

The compounds of formula I are suitable for dyeing, padding or printing fibres, threads or textile materials, particularly natural or regenerated cellulose materials, for example cotton, polyester or synthetic polyamides modified by anionic groups.

The textile material is dyed, printed or pad-dyed in accordance with known methods. Acid modified-polyamide is dyed particularly advantageously in an aqueous, neutral or acid medium, at temperatures of 60° C. to boiling point or at temperatures above 100° C. under pressure.

The textile may also be dyed by the compounds of formula I in organic solvents.

Cellulose material is mainly dyed by the exhaust process, i.e. from a long or short bath, at room temperature to boiling temperature, optionally under pressure, whereby the ratio of the bath is from 1:1 to 1:100 and preferably from 1:20 to 1:50. If dyeing is effected from a short bath, then the liquor ratio is 1:1 to 1:15. The pH of the dyebath varies between 3 and 10 (for short and long dyebaths).

Printing may be effected in accordance with known methods.

The dyestuffs of formula I are particularly suitable for dyeing or printing paper, e.g. for the production of bulk-dyed, sized and unsized paper. The dyestuffs may similarly be used for dyeing paper by the dipping process. The dyeing of paper is effected by known methods. The compounds of formula I are especially suitable for dyeing ligneous paper, particularly wood pulp.

The compounds of formula I may also be applied to bast fibres such as hemp, flax, sisal, jute, coir or straw.

The dyestuffs of formula I are also suitable for dyeing or printing leather by known methods and dyeings with good fastness properties are obtained.

Dyeings prepared with dyestuffs of formula I on paper produce a substantially clear waste liquor which is important for environmental reasons. The dyestuffs of formula I have good build-up properties, do not bleed once applied to paper and are not pH sensitive. They have a high affinity for paper and do not mottle on ligneous paper. Dyeings produced with dyestuffs of formula I have good light fastness and the nuance on exposure for a long time to light fades in tone. The dyestuffs of formula I have good wet-fastness properties not only for water but also for alcohol, milk, soap, water, urine, sodium chloride solution, fruit juice and sweetened mineral water.

Further, the dyestuffs of formula I have good nuance stability.

For their use the compounds of formula I are suitably worked up into stable solid or liquid preparations according to known methods, advantageously by grinding or granulating or by dissolving in suitable solvents, optionally adding an assistant, e.g. a stabiliser, a solubilising or a diluting agent such as urea. Such preparations may be obtained, for example, as described in French Patent Specification Nos. 1,572,030 and 1,581,900 or in accordance with German DOS 2,001,748 and 2,001,816.

Liquid dyeing compositions are preferably as follows:
1 part by weight of a compound of formula I (in salt from);
0.01-1 part by weight of an inorganic salt
0.01-1 part by weight of an organic acid such as formic, acetic, lactic, citric, propionic or methoxy acetic acid;
1-8 parts by weight of water; and
0-5 parts by weight of a solubilising agent such as a glycol (diethylene glycol, triethylene glycol or hexylene glycol), a glycol ether such as methyl cellosolve, methylcarbitol, butylpolyglycol, urea, formamide and dimethylformamide.

Solid dyeing preparations are preferably as follows:
1 part by weight of a compound of formula I (in salt form);
0.01-1 part by weight of an inorganic salt (preferably 0.01 to 0.1 parts);
0-8 parts by weight of a diluting agent such as urea, dextrin, glucose or d-glucose).

The solid compositions may usually contain up to 10% water.

The invention will now be illustrated by the following Examples, in which all parts and percentages are by weight and all temperatures are in °C.

Each $A^{\ominus}$ of the compounds of Tables 1-5 may be any non-chromophoric anion, is preferably one of the non-chromophoric anions listed above and is most preferably chloride.

The dyes of the examples are mixtures that may be separated by conventional means to obtain single compounds. However, they are usually used as obtained, i.e., as mixtures.

EXAMPLE 1

22.9 Parts (0.05 M) of the compound of formula (1a)

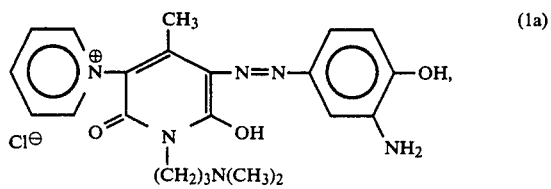
(1a)

are diazotised according to known methods with 3.45 parts (0.05 M) of sodium nitrite at 0°–5° in the presence of 30% hydrochloric acid and then coupled with 5.5 parts (0.05 M) of 1,3-dihydroxybenzene at pH 8.0–8.5. A brown suspension is obtained containing the dyestuff of formula (1b)

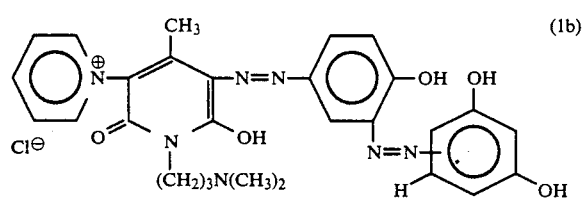
(1b)

The product is a mixture of two isomers. The following metal complexes of dyestuff of formula (1b) are then prepared (1c) 5.8 Parts (0.01 M) of the dyestuff of formula (1b) are metallized according to known methods in water at 70°, at a pH of 4.0–4.8, with 2.5 parts (0.01 M) copper sulphate ($CuSO_4 \cdot 5H_2O$). The corresponding 1:1 copper complex is obtained.

(1d) 5.8 Parts (0.01 M) of the dyestuff of formula (1b) are converted according to known methods into the corresponding 1:2 chromium complex by reaction in water at 95° with 2.5 parts (0.005 M) of chromium potassium alum ($KCr(SO_4)_2 \cdot 12H_2O$)

(1e) By following the procedure of (1d) but replacing the chromium potassium alum by 0.8 parts (0.005 M) cobalt sulphate, there is obtained the corresponding 1:2 cobalt complex.

(1f) By following the procedure of (1d) but replacing the chromium potassium alum by 1.4 parts (0.005 M) ferric chloride ($FeCl_3 \cdot 6H_2O$), there is obtained the corresponding 1:2 iron complex.

The starting compound of formula (1a) may be prepared according to known methods comprising the following steps acetylation of 1-amino-2-hydroxy-5-nitrobenzene reduction according to Béchamp to 1-acetylamino-2-hydroxy-5-aminobenzene diazotation and coupling with 3-pyridinium-4-methyl-6-hydroxy-1-(3'-diemthylaminopropyl)pyrid-2-one chloride, and hydrolysis of the acetyl group under acidic conditions.

EXAMPLE 2

22.1 Parts (0.05 M) of the compound of formula (2c)

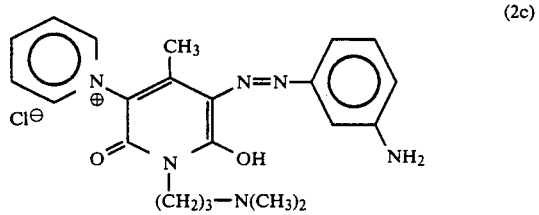
(2c)

are diazotised according to known methods with 3.45 parts (0.05 M) of sodium nitrite at 0°–5° in the presence of 30% hydrochloric acid and then coupled with 5.5 parts (0.05 M) of 1,3-dihydroxybenzene at pH 8–9. The resulting dyestuff is of formula (2d)

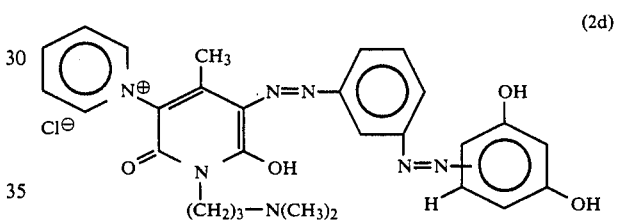
(2d)

22.1 Parts (0.05 M) of the compound of formula (2c) are diazotised and then coupled with 0.05 M of the dyestuff of formula (2d), to give a mixture of isomers of formula (2e)

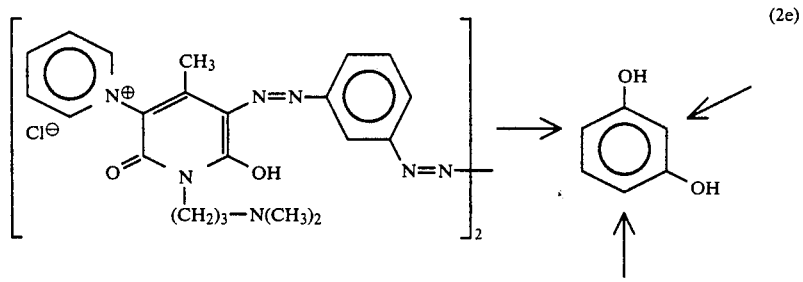
(2e)

the coupling positions being indicated by an arrow.

The resulting isomer mixture of formula (2e) dyes wood pulp paper in a brown orange shade.

By following the procedure described in Example 1 or 2, the dyestuffs of formula

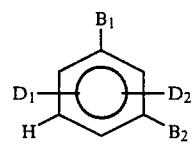

in which $D_1$ is a radical

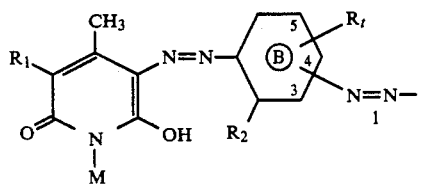

and $B_1$, $B_2$, $D_2$, $R_1$, $R_2$, $R_t$ and M are indicated in Table 1 below, may be obtained.

TABLE 1

| Ex. | $R_1$ | M | $R_2$ | $R_t$ (position on ring B) | Position of the azo 1 on ring B | $B_1$ | $B_2$ | $D_2$ |
|---|---|---|---|---|---|---|---|---|
| 3 | ⊕N⃞ A⊖ (pyridinium) | —(CH$_2$)$_3$—N(CH$_3$)$_2$ | H | H | 4 | OH | OH | H |
| 4 | " | " | H | H | 4 | OH | OH | $D_1$ |
| 5 | " | " | H | H | 4 | NH$_2$ | NH$_2$ | H |
| 6 | " | " | H | H | 4 | NH$_2$ | NH$_2$ | $D_1$ |
| 7 | " | " | H | H | 4 | NH$_2$ | OH | H |
| 8 | " | H | H | H | 3 | OH | OH | H |
| 9 | " | H | H | H | 3 | OH | OH | $D_1$ |
| 10 | " | H | H | H | 3 | NH$_2$ | NH$_2$ | H |
| 11 | " | H | H | H | 3 | NH$_2$ |  | $D_1$ |
| 12 | " | H | H | H | 3 | OH | NH$_2$ | H |
| 13 | " | H | H | H | 4 | OH | OH | H |
| 14 | " | H | H | H | 4 | OH | OH | $D_1$ |
| 15 | " | H | H | H | 4 | OH | NH$_2$ | H |
| 16 | ⊕N⃞ A⊖ CH$_3$ (3-methylpyridinium) | H | H | H | 3 | OH | OH | H |
| 17 | " | H | H | H | 3 | OH | OH | $D_1$ |
| 18 | " | H | H | H | 4 | NH$_2$ | NH$_2$ | H |
| 19 | " | H | H | H | 4 | NH$_2$ | NH$_2$ | $D_1$ |
| 20 | " | H | H | H | 4 | NH$_2$ | OH | H |
| 21 | ⊕N⃞ A⊖ (pyridinium) | —(CH$_2$)$_3$—N(C$_2$H$_5$)$_2$ | H | H | 3 | OH | OH | H |
| 22 | " | " | H | H | 3 | OH | OH | $D_1$ |
| 23 | " | " | H | H | 4 | NH$_2$ | NH$_2$ | H |
| 24 | " | " | H | H | 4 | NH$_2$ | OH | H |
| 25 | " | " | H | H | 4 | OH | OH | H |
| 26 | —CN | " | H | H | 3 | OH | OH | H |
| 27 | " | " | H | H | 3 | OH | OH | $D_1$ |
| 28 | " | " | H | H | 4 | OH | OH | H |
| 29 | " | " | H | H | 4 | OH | NH$_2$ | H |
| 30 | " | " | H | H | 4 | NH$_2$ | NH$_2$ | H |
| 31 | —CONH$_2$ | " | H | H | 3 | OH | OH | H |
| 32 | " | " | H | H | 3 | OH | OH | $D_1$ |
| 33 | " | " | H | H | 4 | NH$_2$ | NH$_2$ | H |
| 34 | H | " | H | H | 3 | OH | OH | H |
| 35 | H | " | H | H | 3 | OH | OH | $D_1$ |
| 36 | H | " | H | H | 4 | NH$_2$ | NH$_2$ | H |
| 37 | H | " | H | H | 4 | NH$_2$ | OH | H |

TABLE 1-continued

| Ex. | $R_1$ | M | $R_2$ | $R_t$ (position on ring B) | Position of the azo 1 on ring B | $B_1$ | $B_2$ | $D_2$ |
|---|---|---|---|---|---|---|---|---|
| 38 | —CN | —(CH$_2$)$_3$N(C$_2$H$_5$)$_2$ | H | H | 3 | OH | OH | H |
| 39 | —CONH$_2$ | " | H | H | 4 | OH | OH | H |
| 40 | H | " | H | H | 4 | NH$_2$ | NH$_2$ | H |
| 41 |  | —(CH$_2$)$_3$—N(CH$_3$)$_2$ | OH | H | 5 | OH | OH | H |
| 42 | " | H | OH | H | 5 | OH | OH | H |
| 43 | " | H | H | OH-(4) | 3 | OH | OH | H |
| 44 | H | —(CH$_2$)$_3$—N(CH$_3$)$_2$ | OH | H | 5 | OH | OH | H |
| 45 | H | " | H | OH-(4) | 3 | OH | OH | H |
| 46 | H | " | H | H | 4 | OH | OH | H |

By following the procedure described in Example 1 or 2, the dyestuffs of the formula

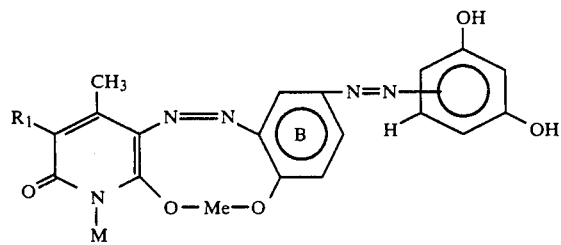

in which R$_1$, M and Me are indicated in Table 2 below, may be produced. When the compounds are in the form of a 1:2 metal complex, the metal is bound to a second molecule identical to the first one.

TABLE 2

| Ex. | $R_1$ | M | Me Metal complex |
|---|---|---|---|
| 47 |  | —(CH$_2$)$_3$—N(CH$_3$)$_2$ | 1:1-Cu |
| 48 | " | " | 1:2-Cr |
| 49 | " | " | 1:2-Co |
| 50 | " | " | 1:2-Fe |
| 51 | " | H | 1:1-Cu |
| 52 | " | H | 1:2-Cr |
| 53 | " | H | 1:2-Co |
| 54 | " | H | 1:2-Fe |
| 55 |  | H | 1:1-Cu |
| 56 | " | H | 1:2-Fe |
| 57 | H | —(CH$_2$)$_3$N(CH$_3$)$_2$ | 1:1-Cu |
| 58 | H | " | 1:2-Cr |
| 59 | H | " | 1:2-Co |
| 60 | H | " | 1:2-Fe |

By following the procedure described in Example 1 or 2, the dyestuffs of the formula

in which R$_1$, M and Me are indicated in Table 3 below, may be produced. When the compounds are in the form of a 1:2 metal complex, the metal is bound to a second molecule identical to the first one.

TABLE 3

| Ex. | $R_1$ | M | Me Metal complex |
|---|---|---|---|
| 61 | 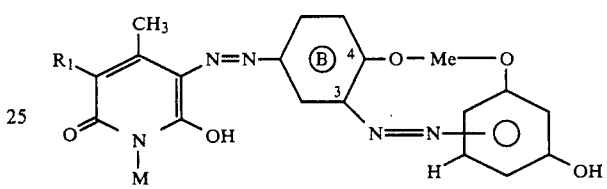 | H | 1:1-Cu |
| 62 | " | H | 1:2-Cr |
| 63 | " | H | 1:2-Co |
| 64 | " | H | 1:2-Fe |
| 65 |  | H | 1:1-Cu |
| 66 | " | H | 1:2-Fe |
| 67 | H | —(CH$_2$)$_3$N(CH$_3$)$_2$ | 1:1-Cu |
| 68 | H | " | 1:2-Cr |
| 69 | H | " | 1:2-Co |
| 70 | H | " | 1:2-Fe |

EXAMPLE 71

A mixture comprising 7.7 parts (0.05 mole) of 4-aminoacetanilide and 22.9 parts (0.15 mole) of 3-aminoacetanilide is diazotised according to known methods with sodium nitrite. To the resulting diazonium salts there is added 58.5 parts (0.18 mole) of 6-hydroxy-4-methyl-1-(3'-dimethylaminopropyl)-3-pyridiniumpyrid-2-one chloride and coupling is carried out according to known methods at pH 1.8–2.2.

The acetyl groups are then removed by hydrolysis with 57.5 parts of 30% hydrochloric acid according to known methods. The resulting amino compounds are diazotised according to known methods with 13.8 parts (0.2 mole) of sodium nitrite and the corresponding diazonium salts are added dropwise to an alkaline solution of 11 parts (0.1 mole) of 1,3-dihydroxybenzene.

There is obtained a brown solution containing the dyestuff of the formula is obtained.

26.1 Parts (0.05 M) of the diazonium salt of the compound of formula (72 b)

(72b)

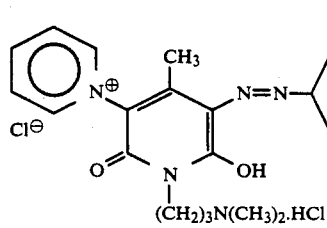
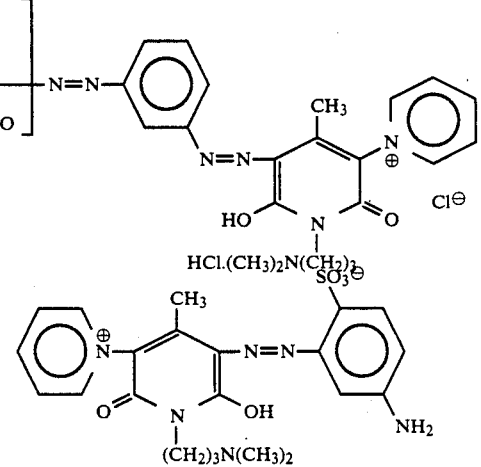

which dyes wood pulp paper a brown shade. It is most preferred to use this dye solution for dyeing without isolating the dye in solid form. The resulting dyestuff is a mixture of tetrakisazo dyes where in about 75% of the total number of diazo component radicals have a meta-phenylene radical and about 25% have a para-phenylene radical.

EXAMPLE 72

22.1 Parts (0.05 mole) of the compound of the formula prepared by diazotation of 1-amino-3acetylaminobenzene-6-sulphonic acid, coupling with the pyridone and hydrolyzing according to known methods, are coupled with 0.05 M of the compound of formula (72 a). The following mixture of isomers is obtained

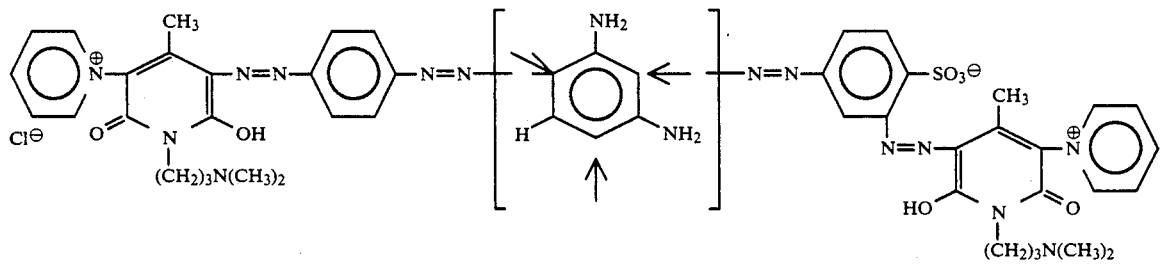

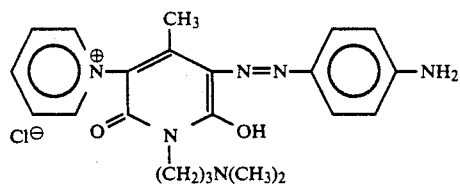

the arrows indicating the various coupling positions.

By following the procedure of Example 72, the compounds of formula (72c)

are diazotised according to known methods with 3.45 parts (0.05 M) of sodium nitrite at 0°–5° in the presence of hydrochloric acid and the resulting diazonium salt is then coupled with 5.4 parts (0.05 M) of 1,3-diaminobenzene at pH 1–3. The following dyestuff of formula (72 a)

(72a)

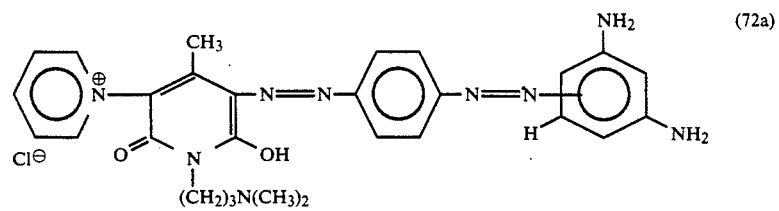

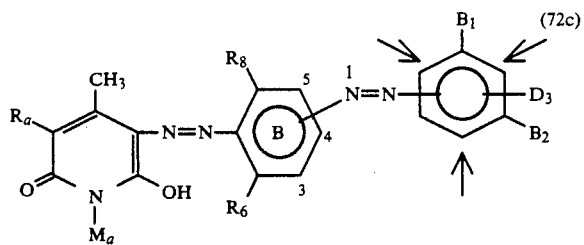
(72c)

in which D₃ is hydrogen or a radical of formula

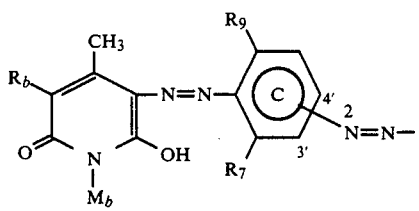

and $B_1$, $B_2$, $R_a$, $R_b$, $R_6$, $R_7$, $R_8$, $R_9$, $M_a$ and $M_b$ have the significances indicated in Table 4 thereafter, may be prepared.

| | Significances of Ma and Mb | |
|---|---|---|
| $M_1$ is H | $M_6$ is | 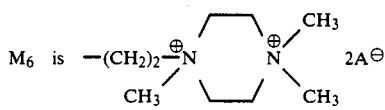 |
| $M_2$ is $-(CH_2)_3N(CH_3)_2$ | | |
| $M_3$ is $-(CH_2)_2N(C_2H_5)_2$ | | |
| $M_4$ is 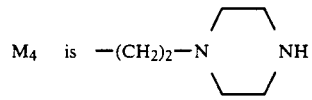 | $M_7$ is $-(CH_2)_3\overset{\oplus}{N}(CH_3)_3\ A^{\ominus}$ | |
| $M_5$ is 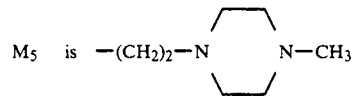 | | |
| | $M_8$ is | 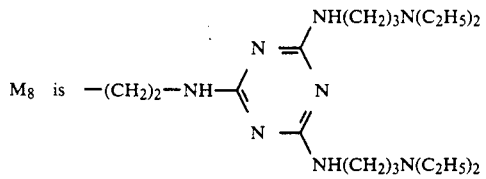 |
| $M_{10}$ is $-(CH_2)_2NH_2$ | | |
| | $M_9$ is | 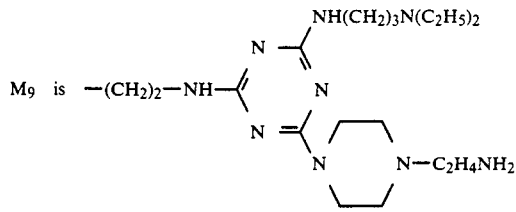 |
| | Significances of Ra and Rb | |
| $R_1$ is H | $R_4$ is $-CN$ | |
| $R_2$ is 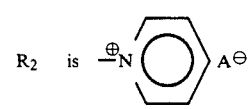 | $R_5$ is 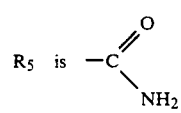 | |
| $R_3$ is 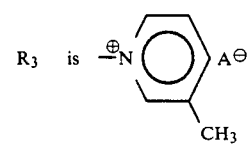 | | |

TABLE 4

| Ex. | Ra | Ma | R6 | R8 | Position of the azo 1 on ring B | H or D3 | Rb | Mb | R7 | R9 | Position of the azo 2 on ring C | B1 | B2 |
|---|---|---|---|---|---|---|---|---|---|---|---|---|---|
| 73 | R2 | M2 | SO3H | H | 3 | H | — | — | — | H | — | OH | OH |
| 74 | R2 | M2 | " | H | 4 | H | — | — | — | H | — | OH | NH2 |
| 75 | R2 | M2 | " | H | 4 | H | — | — | — | H | — | NH2 | NH2 |
| 76 | R2 | M2 | " | H | 3 | D3 | R2 | M2 | SO3H | H | 3' | NH2 | NH2 |
| 77 | R2 | M2 | " | H | 3 | D3 | R2 | M2 | H | H | 4' | NH2 | NH2 |
| 78 | R2 | M2 | " | H | 3 | D3 | R2 | M2 | H | H | 4' | NH2 | NH2 |
| 79 | R2 | M2 | " | H | 3 | D3 | R2 | M2 | H | H | 4' | NH2 | OH |
| 80 | R2 | M2 | " | H | 3 | D3 | R2 | M2 | H | H | 4' | OH | OH |
| 81 | R2 | M2 | " | H | 4 | D3 | R2 | M2 | H | H | 3' | NH2 | NH2 |
| 82 | R3 | M1 | H | H | 3 | D3 | R2 | M2 | SO3H | H | 4' | NH2 | NH2 |
| 83 | R1 | M4 | H | H | 3 | D3 | R2 | M5 | " | H | 4' | OH | NH2 |
| 84 | R4 | M4 | H | H | 3 | D3 | R2 | M6 | " | H | 4' | NH2 | NH2 |
| 85 | R5 | M4 | H | H | 3 | D3 | R2 | M7 | " | H | 4' | NH2 | NH2 |
| 86 | R2 | M2 | SO3H | H | 4 | D3 | R2 | M2 | H | H | 3' | OH | NH2 |
| 87 | R2 | M2 | " | H | 4 | D3 | R2 | M2 | H | H | 3' | OH | OH |
| 88 | R2 | M8 | " | H | 4 | D3 | R2 | M1 | H | H | 3' | OH | OH |
| 89 | R2 | M8 | " | H | 4 | D3 | R2 | M2 | H | H | 3' | OH | NH2 |
| 90 | R2 | M8 | H | H | 4 | D3 | R2 | M4 | SO3H | H | 3' | NH2 | NH2 |
| 91 | R2 | M9 | H | H | 4 | D3 | R2 | M5 | SO3H | H | 3' | OH | NH2 |
| 92 | R2 | M9 | H | H | 3 | D3 | R4 | M3 | " | H | 4' | OH | OH |
| 93 | R2 | M8 | H | H | 3 | D3 | R5 | M4 | " | H | 4' | NH2 | NH2 |
| 94 | R2 | M3 | H | H | 4 | D3 | R2 | M3 | " | H | 3' | NH2 | NH2 |
| 95 | R2 | M2 | H | CH3 | 3 | D3 | R2 | M2 | " | H | 4' | OH | OH |
| 96 | R2 | M3 | H | Cl | 3 | D3 | R2 | M3 | " | H | 4' | NH2 | NH2 |
| 97 | R2 | M2 | H | OCH3 | 3 | D3 | R2 | M4 | " | H | 4' | NH2 | NH2 |
| 98 | R2 | M7 | SO3H | H | 4 | D3 | R2 | M7 | H | Cl | 3' | OH | OH |
| 99 | R2 | M8 | " | H | 4 | D3 | R2 | M2 | H | CH3 | 3' | OH | NH2 |
| 100 | R2 | M6 | " | H | 4 | D3 | R2 | M2 | H | OCH3 | 3' | NH2 | NH2 |
| 101 | R2 | M2 | " | H | 3 | D3 | R2 | M2 | H | H | 3' | OH | NH2 |
| 102 | R2 | M2 | " | H | 4 | D3 | R2 | M2 | H | H | 4' | NH2 | NH2 |
| 103 | R2 | M2 | " | H | 4 | D3 | R2 | M2 | SO3H | H | 4' | NH2 | NH2 |
| 104 | R2 | M2 | " | H | 3 | D3 | R2 | M2 | H | H | 3' | NH2 | NH2 |
| 105 | R2 | M2 | " | H | 4 | D3 | R2 | M2 | H | H | 4' | NH2 | OH |
| 106 | R2 | M2 | " | H | 3 | D3 | R2 | M2 | SO3H | H | 4' | OH | NH2 |
| 107 | R2 | M10 | " | H | 3 | D3 | R2 | M2 | H | H | 3' | OH | OH |

EXAMPLE 108

11.5 Parts (0.05 mole) of 1-amino-3-acetylaminobenzene-6-sulphonic acid are diazotised according to known methods with 3.45 parts (0.05 M) sodium nitrite at 0°–5° in the presence of hydrochloric acid and the resulting diazonium salt is then coupled at pH 8–9 with 5.5 parts (0.05 M) of 1,3-dihydroxybenzene. The dyestuff of formula (108 a)

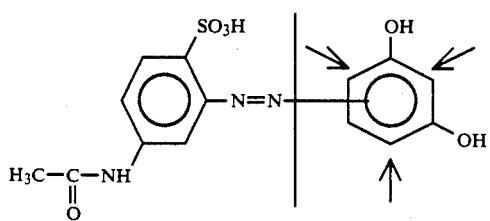

(108a)

is obtained.

7.5 Parts (0.05 M) of 4-aminoacetanilide are diazotised with 3.45 parts (0.05 M) sodium nitrite at 0°–5° and then coupled at pH 9–10.5 with the dyestuff of formula (108 a). The resulting isomer mixture is then hydrolysed at 100° with a solution of 5% sodium hydroxide, to give a mixture of formula (108 b)

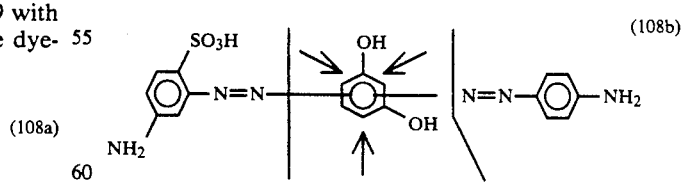

(108b)

21.4 Parts (0.05 M) of the dyestuff mixture of formula (108 b) are tetrazotised with 6.9 parts (0.1 M) of sodium nitrite at 0°–5° in the presence of hydrochloric acid and then coupled at pH 2–3 with 28.7 parts (0.1 M) of 6-hydroxy-4-methyl-1-(3'-dimethylaminopropyl)-3-pyridiniumpyrid-2-one chloride. There is obtained a mixture of dyestuffs of formula (108c)

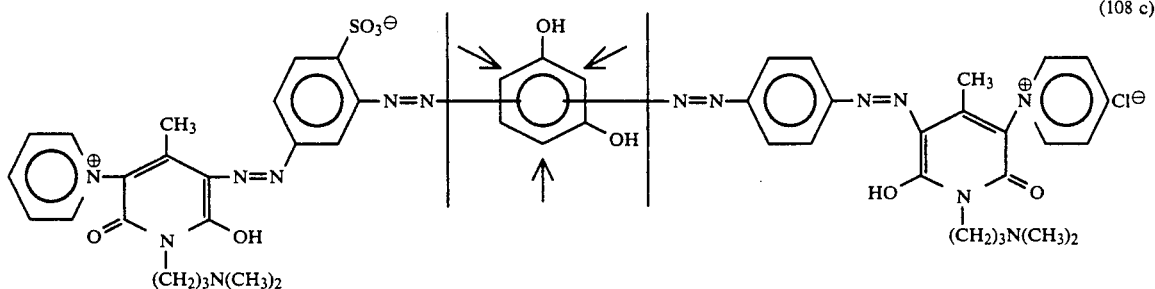

which dyes paper in a brown shade. The arrows indicate the coupling positions.

By following the procedure described in one of the preceding Examples, the compounds of formula (108 d) and $R_a$, $R_b$, $R_5$, $R_6$, $B_1$, $B_2$, $M_a$ and $M_b$ have the significances indicated in Table 5 below, may be prepared.

In formula (108 d), the arrows indicate the coupling positions.

TABLE 5

| Ex. Nr. | Ra | Ma | R5 | Position of the azo 3 on ring D | d4 | Rb | Mb | R6 | Position of the azo 4 on ring E | B1 | B2 |
|---|---|---|---|---|---|---|---|---|---|---|---|
| 109 | R2 | M2 | SO3H | 1 | H | — | — | — | — | OH | OH |
| 110 | R2 | M2 | " | 1 | H | — | — | — | — | NH2 | NH2 |
| 111 | R2 | M2 | " | 2 | H | — | — | — | — | OH | NH2 |
| 112 | R2 | M2 | " | 2 | H | — | — | — | — | NH2 | NH2 |
| 113 | R2 | M2 | " | 1 | D4 | R2 | M2 | H | 1' | OH | NH2 |
| 114 | R2 | M2 | " | 1 | D4 | R2 | M2 | H | 1' | NH2 | NH2 |
| 115 | R2 | M2 | " | 1 | D4 | R2 | M2 | SO3H | 1' | OH | OH |
| 116 | R2 | M2 | " | 1 | D4 | R2 | M2 | H | 2' | OH | OH |
| 117 | R2 | M2 | " | 1 | D4 | R2 | M2 | H | 2' | NH2 | NH2 |
| 118 | R2 | M2 | " | 1 | D4 | R2 | M2 | SO3H | 2' | OH | NH2 |
| 119 | R2 | M2 | " | 2 | D4 | R2 | M2 | " | 2' | OH | OH |
| 120 | R3 | M3 | " | 1 | D4 | R3 | M3 | H | 1' | OH | OH |
| 121 | R2 | M4 | " | 1 | D4 | R2 | M4 | H | 2' | NH2 | NH2 |
| 122 | R2 | M5 | H | 1 | D4 | R2 | M5 | SO3H | 2' | NH2 | OH |
| 123 | R2 | M6 | H | 2 | D4 | R2 | M6 | " | 1' | OH | OH |
| 124 | R3 | M7 | H | 2 | D4 | R3 | M7 | " | 1' | NH2 | OH |
| 125 | R1 | M8 | SO3H | 2 | D4 | R1 | M8 | " | 1' | OH | OH |
| 126 | R1 | M8 | " | 2 | D4 | R1 | M8 | H | 1' | NH2 | NH2 |
| 127 | R2 | M9 | " | 1 | D4 | R2 | M9 | H | 2' | OH | NH2 |
| 128 | R2 | M2 | " | 2 | D4 | R2 | M2 | H | 1' | OH | OH |
| 129 | R2 | M2 | H | 2 | D4 | R2 | M2 | SO3H | 1' | OH | OH |
| 130 | R2 | M2 | SO3H | 2 | D4 | R2 | M2 | H | 1' | NH2 | NH2 |
| 131 | R2 | M2 | H | 2 | D4 | R2 | M2 | SO3H | 1' | NH2 | NH2 |
| 132 | R2 | M2 | SO3H | 2 | D4 | R2 | M2 | " | 1' | NH2 | NH2 |
| 133 | R2 | M2 | " | 1 | D4 | R2 | M2 | " | 1' | NH2 | NH2 |
| 134 | R2 | M2 | H | 2 | D4 | R2 | M2 | " | 1' | OH | NH2 |
| 135 | R2 | M2 | SO3H | 2 | D4 | R2 | M2 | " | 1' | OH | NH2 |
| 136 | R2 | M2 | " | 1 | D4 | R2 | M2 | " | 1' | OH | NH2 |

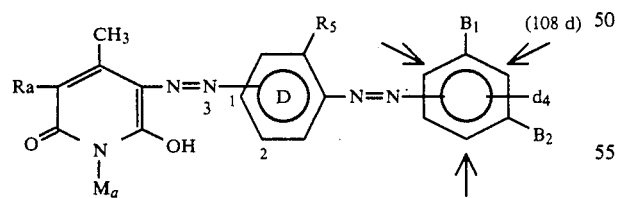

in which d4 is H or D4

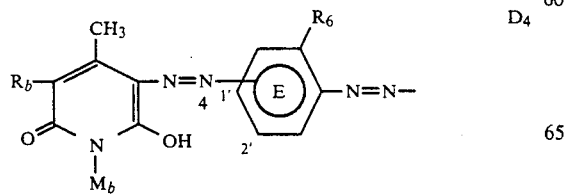

EXAMPLE 137

(1) 26.1 Parts (0.05 M) of the diazonium salt of the compound of formula (137 a)

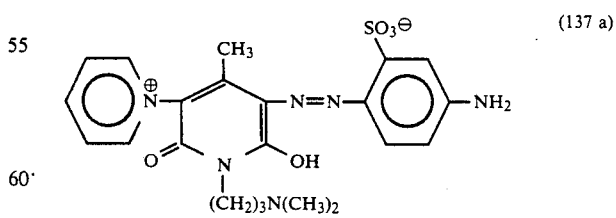

prepared by diazotation of 1-amino-4-acetylaminobenzene-6-sulphonic acid, coupling with the corresponding pyridone and hydrolysis of the acetyl group according to known methods, are coupled with 29 parts (0.05 M) of the compound of formula (137 b)

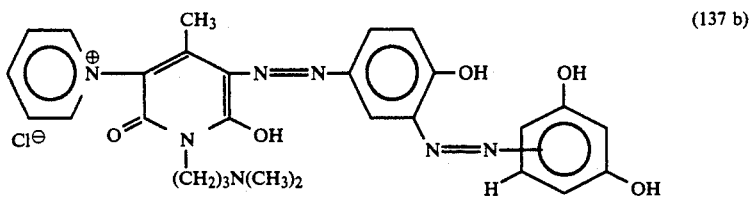

(137 b)

The resulting dyestuff is of formula (137 c)

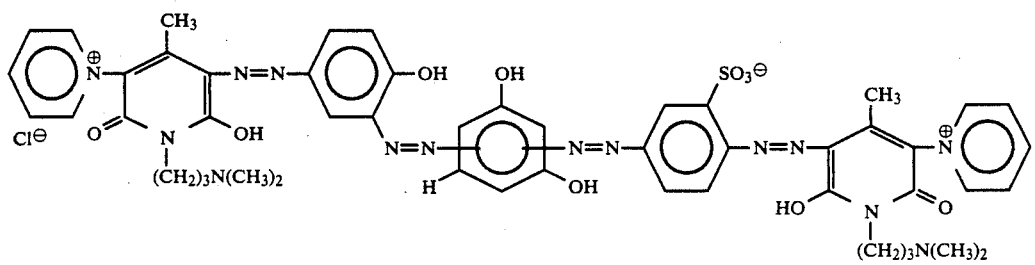

(137 c)

11.13 Parts (0.01 M) of the compound of formula (137 c) are reacted with 2.5 parts (0.01 M) of copper sulphate (CuSO$_4$·5H$_2$O) in water at 70°, at pH 4.0–4.8 to give the corresponding 1:1 copper complex.

(2) 26.1 Parts (0.05 M) of the diazonium salt of the compound of formula (137 a) are coupled with 29 parts (0.05 M) of the compound of formula (137 d)

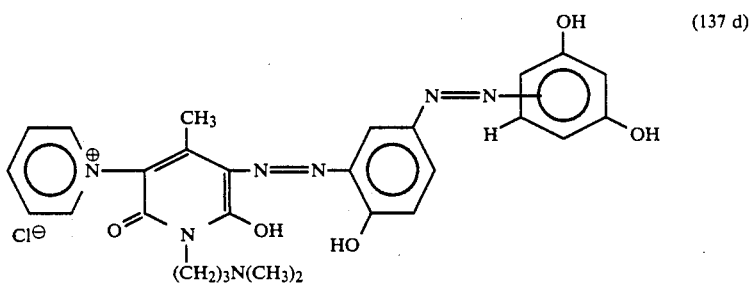

(137 d)

to give the compound of formula (137 e)

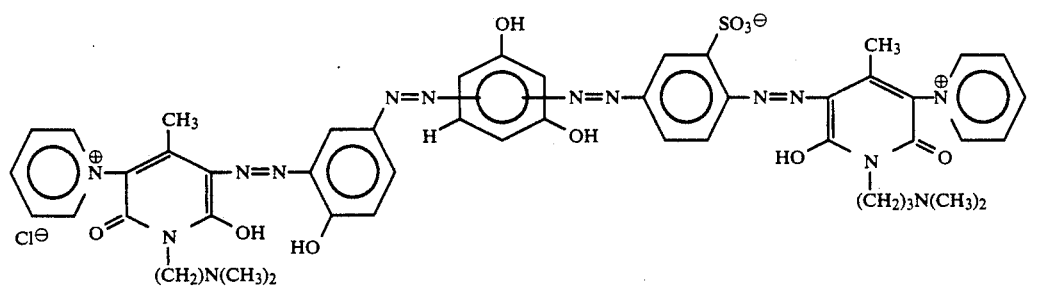

(137 e)

The compound of formula (137 d) may be prepared in accordance with known methods:
nitration of 4-acetylamino-1-hydroxybenzene to 4-acetylamino-2-nitro-1-hydroxybenzene
reduction according to Béchamp
diazotation and coupling with the pyridone
hydrolysis of the acetyl group
diazotation and coupling with 1,3-dihydroxybenzene.

(2a–d) 11.13 parts (0.01 M) of the compound of formula (137 e) are converted into metal complexes (Cu, Cr, Co, Fe) according to the procedure disclosed for the compound of formula (137 c).

APPLICATION EXAMPLE A

70 Parts of chemically bleached sulphite cellulose obtained from pinewood and 30 parts of chemically bleached sulphite cellulose obtained from birchwood are ground in 2000 parts of water in a Hollander. 0.2 Parts of the dyestuff of formula (1 b) of Example 1 in salt for are added into this pulp. Paper is produced from this pulp after mixing for 20 minutes. The absorbent paper which is obtained in this manner is dyed in a brown tone and the waste water is practically colourless.

APPLICATION EXAMPLE B 0.5 Parts of the dyestuff of formula (1 b) of Example 1 used in salt form are added to 100 parts of chemically bleached sulphite cellulose which have been ground in a Hollander with 2000 parts of water. Sizing takes place after a thorough mixing for 15 minutes. The paper which is produced from this material has a brown tone and has good wet fastness properties.

APPLICATION EXAMPLE C

An absorbent web of unsized paper is drawn at a temperature of 40° to 50° through a dye solution having the following composition:
0.5 parts of the dyestuff of formula (1 b) of Example 1 in salt form)
0.5 parts of starch
99.0 parts of water.

The excess dye solution is squeezed out through two rollers. The dried web of paper is dyed in a brown tone.

Any one of the dyes of Examples 2 to 137 may be used either in water-soluble salt form or in the form of a dye preparation, e.g. granulates in any one of Application Examples A to C.

APPLICATION EXAMPLE D

100 Parts of freshly tanned and neutralized chrome leather are agitated for 30 minutes in a vessel with a dyebath of 250 parts of water and 1 part of the dyestuff of formula (1 b) of Example 1 (in salt form) at 55° and are then treated in the same bath for 30 minutes with 2 parts of an anionic fatty liquor based on sulphonated train oil. The leather is then dried and prepared in the normal way, giving a leather evenly dyed in a brown tone.

Other low affinity vegetable retanned leathers can be similarly dyed by known methods, using any one of the dyestuffs of Examples 2 to 137.

APPLICATION EXAMPLE E

2 Parts of the dyestuff of Example 1 (in salt form) are dissolved in 4000 parts of demineralised water at 40°. 100 Parts of a prewetted cotton textile substrate are added and the bath is raised to boiling point over 30 minutes and held at the boil for 1 hour, topping up with water where necessary. Upon removal of the dyed fabric from the bath, washing and drying, a brown dyeing is obtained with good light fastness and wet fastness properties. The dyestuff exhausts practically totally and the waste water is practically colourless.

Any one of the dyestuffs of Examples 2 to 137 may be used in place of that of Example 1 in any one of Application Examples D and E.

Application Example F 15 kg waste paper, 25 kg bleached mechanical pulp and 10 kg unbleached sulphate cellulose are defibrated in a pulper into a 3% aqueous pulp slurry. This stock suspension is diluted to 2% in a dyeing chest. To this diluted suspension there are added at first 5% by weight china clay and the 1.25 kg of a 5% acetic acid solution of the dyestuff of formula (1 b) of Example 1, the % being based on the dry weight of fibres. After 20 minutes, a 1% resin size dispersion (based on the weight of absolutely dry fibres) is added to the resulting pulp in the mixing chest. The homogeneous pulp slurry is then adjusted to pH 5 by addition of alum shortly before introduction into the paper machine.

A brown 80 g/m² heavy bag paper is produced on the paper machine. The resulting dyed paper exhibits very good fastness properties to bleeding according to DIN 53 991 and good light fastness properties.

The resulting paper can almost completely be decolourized by hypochlorite.

EXAMPLE G

Water is added to a dry pulp in a hollander consisting of 60% by weight of mechanical wood pulp and 40% by weight of unbleached sulphite cellulose and the slurry is beaten in order to obtain a dry content slightly exceeding 2.5% and having a beating degree of 40 SR. The slurry is then exactly adjusted to a high density dry content of 2.5%.

5 Parts of a 0.25% aqueous solution of the dyestuff of formula (1 b) of Example 1 are added to 200 parts of the above resulting slurry. The mixture is stirred for about 5 minutes and, after addition of 2% by weight resin size and then 4% by weight alum (based on the dry weight) is further stirred for a few minutes until homogeneous. The resulting pulp is diluted with about 500 parts water to a volume of 700 parts and then used for the production of sheets by suction on a sheet former. The resulting paper sheets are dyed in an intense brown shade. The residual dyestuff concentration in the waste water from the sheet former has been measured photometrically and is substantially low.

Any one of the dyestuffs of Examples 2 to 137 may be used in place of that of Example 1 in any one of Application Examples F and G. The waste water exhibits a substantially low residual dyestuff concentration.

What is claimed is:

1. A composition of matter which is (i) a metal-free compound of the formula

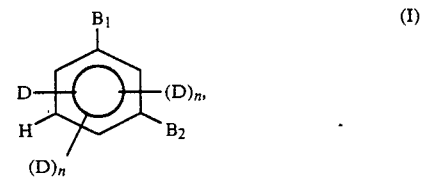

or a salt thereof, (ii) a 1:1 complex of a metallizable compound of Formula I, or a salt thereof, (iii) a 1:2 metal complex of a metallizable compound of Formula I, or a salt thereof, (iv) a 1:2 metal complex of two metallizable compounds of Formula I, or a salt thereof, (v) a 1:2 metal complex of a metallizable compound of Formula I and a metallizable compound not of Formula I, or a salt thereof, or (vi) a mixture thereof, wherein each of $B_1$ and $B_2$ is independently hydroxy or amino, each D is independently

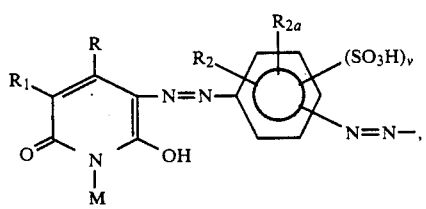

wherein
R is hydrogen, $C_{1-4}$alkyl, $C_{5-6}$cycloalkyl, phenyl, benzyl or phenylethyl,
$R_1$ is hydrogen, cyano, —$COOR_4$, —$CONR_5R_6$, —$SO_2NR_5R_6$,

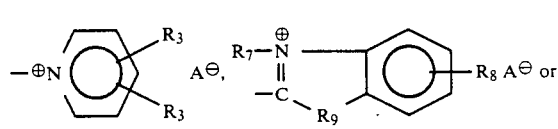

-continued

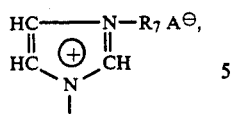

wherein each $R_3$ is independently hydrogen, $C_{1-4}$alkyl, $-NR_5R_6$ or $-CONR_5R_6$, $R_4$ is $C_{1-6}$alkyl or phenyl($C_{1-3}$alkyl), $R_7$ is $C_{1-4}$alkyl, $R_8$ is hydrogen or $C_{1-4}$alkyl, and $R_9$ is $-S-$, $-O-$ or $-NR_5-$, $R_2$ is hydrogen, hydroxy or $C_{1-4}$alkoxy, $R_{2a}$ is hydrogen, $C_{1-4}$alkyl or halo, M is hydrogen; $C_{1-8}$alkyl; $(C_{1-4}$alkoxy$)$-$C_{1-4}$alkyl; $C_{2-4}$hydroxyalkyl; $C_{5-6}$cycloalkyl; $C_{5-6}$cycloalkyl substituted by 1 to 3 $C_{1-4}$alkyl groups; phenyl($C_{1-3}$alkyl); phenyl($C_{1-3}$alkyl) the phenyl group of which is substituted by 1 to 3 $C_{1-4}$alkyl groups; $-NR_{11}R_{12}$; $-A_1-NR_{13}R_{14}$; $-A_2-N^{\oplus}R_{13}R_{14}R_{15}$ $A^{\ominus}$ or

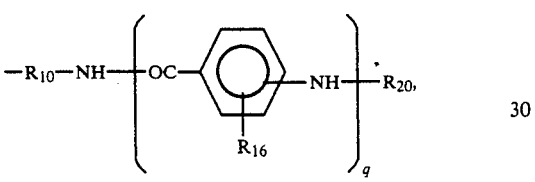

wherein $A_1$ is linear or branched $C_{1-6}$alkylene or linear or branched $C_{2-6}$alkenylene, $A_2$ is linear or branched $C_{2-6}$alkylene or linear or branched $C_{2-6}$alkenylene, $R_{10}$ is linear or branched $C_{1-10}$alkylene; linear or branched $C_{2-10}$alkenylene; linear or branched alkylene or alkenylene having a maximum of 10 carbon atoms and interrupted by 1 or 2 atoms selected from oxygen and nitrogen; phenylene; or cyclohexylene, $R_{16}$ is hydrogen, halo, nitro, $C_{1-4}$alkyl or $C_{1-4}$alkoxy, $R_{20}$ is hydrogen, $-CO-(CH_2)_m-NR_{11}R_{12}$, $-CO-(CH_2)_m-N^{\oplus}R_{13}R_{14}R_{15}$ $A^{\ominus}$ or

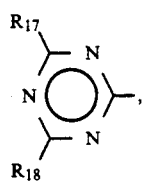

wherein m is 1 to 6, with the proviso that $R_{20}$ is other than hydrogen when q is 0, and q is 0 or 1, v is 0, 1 or 2, and each n is independently 0 or 1, wherein each $R_5$ and $R_6$ is independently hydrogen or $C_{1-4}$alkyl, or $-NR_5R_6$ is morpholino; pyrrolidino; piperidino; piperazino; or morpholino, pyrrolidino, piperidino or piperazino substituted by 1 to 3 $C_{1-4}$alkyl groups, each $R_{11}$ and $R_{12}$ is independently hydrogen; $C_{1-6}$alkyl; $C_{2-6}$alkyl monosubstituted by halo, hydroxy or cyano; phenyl($C_{1-3}$alkyl); phenyl($C_{1-3}$alkyl) the phenyl group of which is substituted by 1 to 3 substituents selected from halo, $C_{1-4}$alkyl and $C_{1-4}$alkoxy; $C_{5-6}$cycloalkyl; or $C_{5-6}$cycloalkyl substituted by 1 to 3 $C_{1-4}$alkyl groups, or $-NR_{11}R_{12}$ is morpholino; pyrrolidino; piperidino; piperazino; or morpholino, pyrrolidino, piperidino or piperazino substituted by 1 to 3 $C_{1-4}$alkyl groups, each $R_{13}$ and $R_{14}$ is independently hydrogen; $C_{1-6}$alkyl; $C_{2-6}$alkyl monosubstituted by halo, hydroxy or cyano; phenyl($C_{1-3}$alkyl); phenyl($C_{1-3}$alkyl) the phenyl group of which is substituted by 1 to 3 substituents selected from halo, $C_{1-4}$alkyl and $C_{1-4}$alkoxy; $C_{5-6}$cycloalkyl; or $C_{5-6}$cycloalkyl substituted by 1 to 3 $C_{1-4}$alkyl groups, and each $R_{15}$ is independently $C_{1-4}$alkyl or phenyl($C_{1-4}$alkyl), or $-N^{\oplus}R_{13}R_{14}R_{15}$ is N-$R_{15}$-morpholinium; N-$R_{15}$-pyrrolidinium; N-$R_{15}$-piperidinium; N-$R_{15}$-piperazinium; N-$R_{15}$-morpholinium, N-$R_{15}$-pyrrolidinium, N-$R_{15}$-piperidinium or N-$R_{15}$-piperazinium substituted by 1 to 3 $C_{1-4}$alkyl groups; pyridinium; pyridinium substituted by 1 to 3 $C_{1-4}$alkyl groups; or

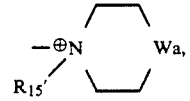

wherein $R_{15}'$ is methyl, ethyl, propyl or benzyl,

Wa is $-S-$, $-SO-$, $-SO_2-$, $-NR_{50a}-$ or $-^{\oplus}N(R_{15}')_2-$ $A^{\ominus}$, wherein $R_{50a}$ is benzyl or $C_{1-4}$alkyl substituted by amino, and $R_{15}'$ is as defined above, and $R_{15}$ is as defined above, $R_{17}$ is halo, hydroxy, $C_{1-4}$alkoxy, phenyl, amino or an aliphatic, cycloaliphatic, aromatic or heterocyclic amino group the nitrogen atom of which is attached to the 1,3,5-triazine ring, and $R_{18}$ is an aliphatic, cycloaliphatic, aromatic or heterocyclic amino group the nitrogen atom of which is attached to the 1,3,5-triazine ring, wherein each $A^{\ominus}$ is independently a non-chromophoric anion, and each halo is independently fluoro, chloro, bromo or iodo, with the provisos that (1) when the compound of Formula I is free of sulfo groups, it contains at least one water-solubilizing protonatable basic or cationic group, (2) when the compound of Formula I contains at least one sulfo group, the total number of water-solubilizing basic and cationic groups that it contains exceeds the number of sulfo groups that it contains by at least one, (3) when the composition of matter is a metal-free compound of Formula I, or a salt thereof, at least one n is 1, at least one v is 1, at least one $R_2$ is hydroxy or $C_{1-4}$alkoxy or at least one $R_{2a}$ is halo, and (4) when the composition of matter is a 1:2 metal complex, or a salt thereof, the negative charge of the complexed metal ion is balanced by hydrogen or a non-chromophoric cation.

2. A composition of matter according to claim 1 which is a metal-free compound, or a salt thereof, a mixture of metal-free compounds or salts or a mixture of metal-free compounds and salts.

3. A composition of matter according to claim 1 wherein $R_{10}$ is linear or branched $C_{1-10}$alkylene, linear or branched $C_{2-10}$alkenylene, phenylene or cyclohexylene, each $R_{13}$ is independently $R_{13}'$, each $R_{14}$ is independently $R_{14}'$, each $R_{15}$ is independently $R_{15}'$, or $-^{\oplus}NR_{13}R_{14}R_{15}$ is $-N^{\oplus}R_{13}'R_{14}'R_{15}'$, $R_{17}$ is chloro, hydroxy, methoxy, amino, N,N-di-($C_{2-4}$hydroxyalkyl)amino, $-NR_5'R_{19}$,

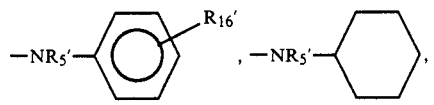

wherein $R_{16}'$ is hydrogen, chloro, nitro, methyl or methyoxy, and $R_{51}$ is hydrogen, $C_{1-4}$alkyl or $C_{1-4}$alkyl substituted by amino, and $R_{18}$ is $-NR_5'R_{19}$, wherein each $R_{19}$ is independently $C_{1-12}$alkyl; $C_{1-12}$hydroxyalkyl; alkyl having a maximum of 12 carbon atoms which is interrupted by 1 to 3 radicals selected from $-NR_5-$ and $-N^{\oplus}(R_7)_2- A^{\ominus}$; alkyl having a maximum of 12 carbon atoms which is substituted by hydroxy and interrupted by 1 to 3 radicals selected from $-NR_5-$ and $-N^{\oplus}(R_7)_2- A^{\ominus}$; $-NH-CO-CH_2-Z_1$; $-CH_2-CO-NH-Y-Z_1$; $-Y-Z_1$;

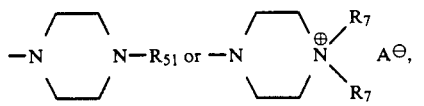

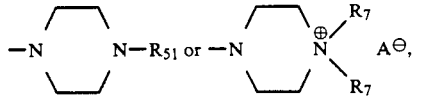

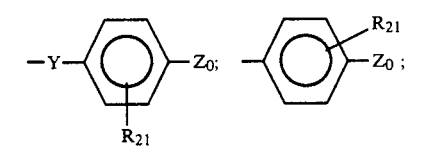

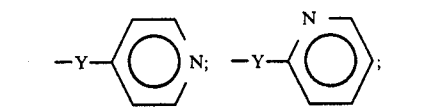

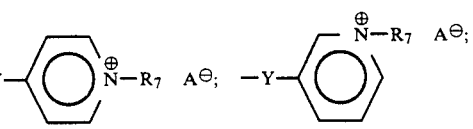

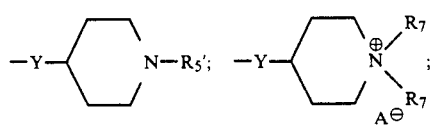

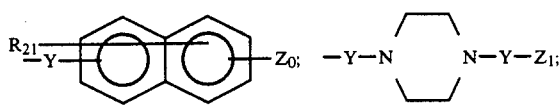

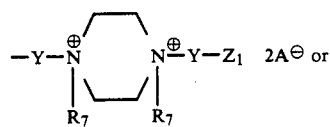

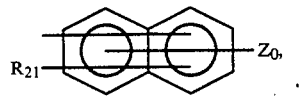

wherein $R_{21}$ is hydrogen, halo, hydroxy, nitro, $C_{1-4}$alkyl or $C_{1-4}$alkoxy, each Y is independently linear or branched $C_{1-8}$alkylene or linear or branched $C_{3-8}$alkylene, and $Z_o$ is dimethylamino, diethylamino, trimethylammonium $A^{\ominus}$, triethylammonium $A^{\ominus}$, $-CO-Y_o-Z_1$, $-CO-NH-Y_o-Z_1$, $-SO_2-NH-Y_o-Z_1$, $-NH-CO-Y_o-Z_1$, $-Y_o-Z_1$ or $-NHNH-CO-CH_2-Z_1$, wherein $Y_o$ is linear or branched $C_{1-4}$alkylene, wherein each $R_5'$ is independently hydrogen, methyl or ethyl, each $R_7$ is independently $C_{1-4}$alkyl, and each $Z_1$ is independently $-NR_{11}'R_{12}'$ or $-N^{\oplus}R_{13}'R_{14}'R_{15}'\ A^{\ominus}$, wherein each $R_{11}'$ and $R_{12}'$ is independently hydrogen, $C_{1-6}$alkyl, n-$C_{2-3}$hydroxyalkyl, benzyl, 2-cyanoethyl or 2-chloroethyl, or $-NR_{11}'R_{12}'$ is morpholino, pyrrolidino, piperidino, piperazino or N-$C_{1-4}$alkylpiperazino, each $R_{13}'$ and $R_{14}'$ is independently $C_{1-6}$alkyl, n-$C_{2-3}$hydroxyalkyl, benzyl, 2-cyanoethyl or 2-chloroethyl, each $R_{15}'$ is independently methyl, ethyl, propyl or benzyl, or $-N^{\oplus}R_{13}'R_{14}'R_{15}'$ is pyridinium, methylpyridinium, dimethylpyridinium or

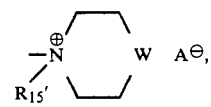

wherein

W is a direct bond, $-CO_2-$, $-O-$, $-S-$, $-SO-$, $-SO_2-$, $-NH-$, $-NR_{50}-$ or $-^{\oplus}N(R_{15}')_2- A^{\ominus}$, wherein $R_{50}$ is $C_{1-4}$alkyl, benzyl or $C_{1-4}$alkyl substituted by amino, and $R_{15}'$ is as defined above.

4. A composition of matter according to claim 3 which is a metal-free compound or a salt thereof, a mixture of metal-free compounds or salts or a mixture of metal-free compounds and salts.

5. A composition of matter according to claim 3 wherein

R$_{17}$ is chloro, hydroxy, methoxy, amino, C$_{1-2}$alkylamino, C$_{2-4}$hydroxyalkylamino, N,N-di-(C$_{2-4}$hydroxyalkyl)amino, —NR$_5''$R$_{19}'$,

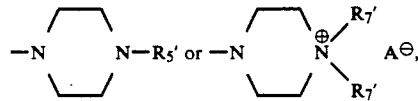

and

R$_{18}$ is —NR$_5''$R$_{19}'$,
wherein
each R$_{19}'$ is independently —(CH$_2$)$_a$—NR$_5''$—CH$_3$, —(CH$_2$)$_a$—NR$_5''$—C$_2$H$_5$, —(CH$_2$)$_a$—NR$_5''$—(CH$_2$)$_a$—NR$_5''$—C$_2$H$_5$, —(CH$_2$)$_a$—N$^\oplus$(R$_{13}''$)$_2$—C$_2$H$_5$ A$^\ominus$, —(CH$_2$)$_a$—N$^\oplus$(R$_{13}''$)$_2$—(CH$_2$)$_a$—N$^\oplus$(R$_{13}''$)$_2$—C$_2$H$_5$ 2A$^\ominus$, —NH—CO—CH$_2$—Z$_2$, —CH$_2$—CO—NH—Y'—Z$_2$, —Y''—Z$_2$,

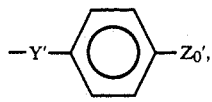

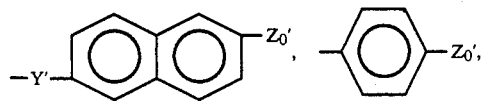

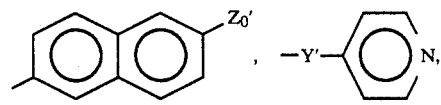

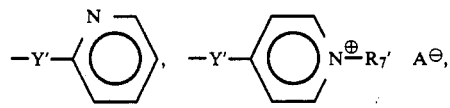

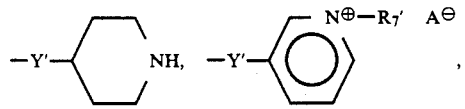

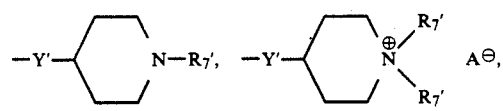

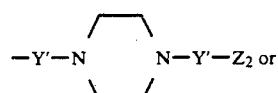

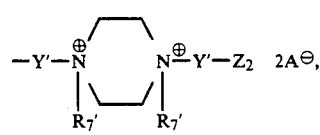

wherein
each Y' is independently linear or branched C$_{1-4}$alkylene,

Z$_o$ is dimethylamino, trimethylammonium A$^\ominus$, —CO—NH—Y$_o'$—Z$_2$, —NH—CO—Y$_o'$—Z$_2$, —CO—Y$_o'$—Z$_2$, —SO$_2$—NH—Y$_o'$—Z$_2$, —Y$_o'$—Z$_2$ or —NHNH—CO—CH$_2$—Z$_2$, wherein
Y$_o'$ is linear or branched C$_{2-4}$alkylene, and
each a is independently 2 or 3,
wherein
each R$_5''$ is independently hydrogen or methyl,
each R$_7'$ is independently methyl or ethyl, and
each Z$_2$ is independently —NR$_{11}''$R$_{12}''$ or —N$^\oplus$R$_{13}''$R$_{14}''$R$_{15}''$ A$^\ominus$,
wherein
each R$_{11}''$ and R$_{12}''$ is independently hydrogen, methyl or ethyl, or
—NR$_{11}''$R$_{12}''$ is morpholino, piperazino or N-methylpiperazino,
each R$_{13}''$ and R$_{14}''$ is independently methyl or ethyl, and
each R$_{15}''$ is independently methyl, ethyl or benzyl, or
—N$^\oplus$R$_{13}''$R$_{14}''$R$_{15}''$ is pyridinium, 2-picolinium, 3-picolinium, N-methylmorpholinium, N-methylpiperidinium, N-methylpiperazinium or N,N'-dimethylpiperazinium.

6. A composition matter according to claim 5 which is a metal-free compound or a salt thereof, a mixture of metal-free compounds or salts or a mixture of metal-free compounds and salts.

7. A composition of matter according to claim 3 which is (i) a metal-free compound of the formula

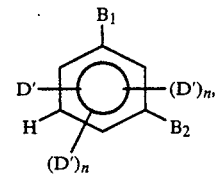

(Ia)

or a salt thereof, (ii) a 1:1 metal complex of a metallizable compound of Formula Ia, or a salt thereof, (iii) a 1:2 metal complex of a metallizable compound of Formula Ia, or a salt thereof, (iv) a 1:2 metal complex of two metallizable compounds of Formula Ia, or a salt thereof, (v) a 1:2 metal complex of a metallizable compound of Formula Ia and a metallizable compound not of Formula Ia, or a salt thereof, or (vi) a mixture thereof, wherein
each D' is independently

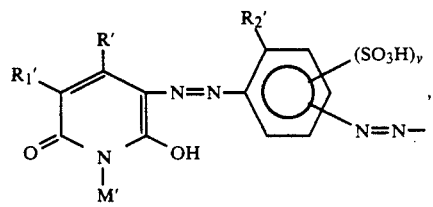

wherein
R' is methyl, ethyl, phenyl, benzyl or cyclohexyl,
R$_1'$ is hydrogen, cyano, —CONR$_5'$R$_6'$ or

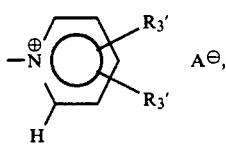

wherein
each $R_3'$ is independently hydrogen, methyl, ethyl, amino or dimethylamino,
$R_2'$ is hydrogen, hydroxy or methoxy, and
M' is hydrogen, methyl, ethyl, 2-hydroxyethyl, 2-methoxyethyl, 2-ethoxyethyl, cyclohexyl, benzyl, —CH$_2$NR$_{13}'$R$_{14}'$, —(CH$_2$)$_2$—NR$_{13}'$R$_{14}'$, —(CH$_2$)$_3$—NR$_{13}'$R$_{14}'$, —(CH$_2$)$_2$—N$^{\oplus}$R$_{13}'$R$_{14}'$R$_{15}'$ A$^{\ominus}$, —(CH$_2$)$_3$—N$^{\oplus}$R$_{13}'$R$_{14}'$R$_{15}'$ A$^{\ominus}$ or

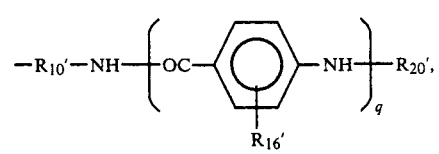

wherein
$R_{10}'$ is linear or branched $C_{1-8}$-alkylene, m-phenylene or p-phenylene,
$R_{16}'$ is hydrogen, chloro, nitro, methyl or methoxy, and
$R_{20}'$ is hydrogen, —CO—CH$_2$Z$_1$, —CO—(CH$_2$)$_2$—Z$_1$ or

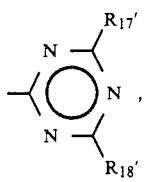

with the proviso that $R_{20}'$ is other than hydrogen when q is 0,
wherein
each $R_5'$ and $R_6'$ is independently hydrogen, methyl or ethyl, or
—NR$_5'$R$_6'$ is morpholino, pyrrolidino, piperidino, piperazino or N-C$_{1-4}$alkylpiperazino,
$R_{17}'$ is chloro, hydroxy, methyoxy, amino, N,N-di-(C$_{2-4}$hydroxyalkyl)amino, —NR$_5'$R$_{19}$,

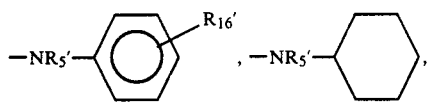

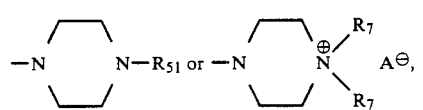

$R_{18}'$ is —NR$_5'$R$_{19}$.

8. A composition of matter according to claim 7 which is a metal-free compound or a salt thereof, a mixture of metal-free compounds or salts or a mixture of metal-free compounds and salts.

9. A composition of matter according to claim 7 wherein
$R_{17}'$ is chloro, hydroxy, methoxy, amino, C$_{1-2}$alkylamino, C$_{2-4}$hydroxyalkylamino, N,N-di-(C$_{2-4}$hydroxyalkyl)amino, —NR$_5''$R$_{19}'$,

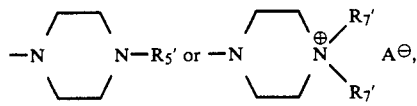

$R_{18}'$ is —NR$_5''$R$_{19}'$,
wherein
each $R_{19}'$ is independently —(CH$_2$)$_a$—NR$_5''$—CH$_3$, —(CH$_2$)$_a$—NR$_5''$—C$_2$H$_5$, —(CH$_2$)$_a$—NR$_5''$—(CH$_2$)$_a$—NR$_5''$—C$_2$H$_5$, —(CH$_2$)$_a$—N$^{\oplus}$(R$_{13}''$)$_2$—C$_2$H$_5$ A$^{\ominus}$, —(CH$_2$)$_a$—N$^{\oplus}$(R$_{13}''$)$_2$—(CH$_2$)$_a$—N$^{\oplus}$(R$_{13}''$)$_2$—C$_2$H$_5$ 2A$^{\ominus}$, —NH—CO—CH$_2$—Z$_2$, —CH$_2$—CO—NH—Y'—Z$_2$, —Y'—Z$_2$,

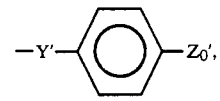

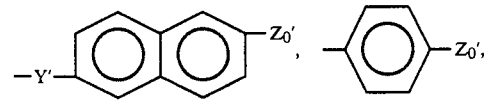

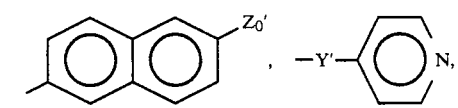

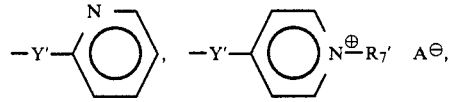

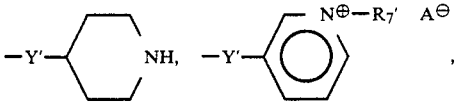

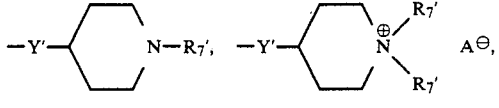

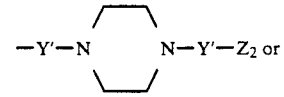

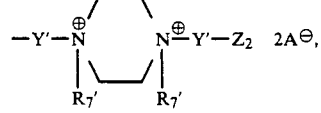

wherein
each Y' is independently linear or branched $C_{1-4}$alkylene,
$Z_o'$ is dimethylamino, trimethylammonium A$^{61}$, —CO—NH—Y$_o'$—Z$_2$, —NH—CO—Y$_o'$—Z$_2$, —CO—Y$_o'$—Z$_2$, —SO$_2$—NH—Y$_o'$—Z$_2$, —Y$_o'$—Z$_2$ or —NHNH—CO—CH$_2$—Z$_2$, wherein $Y_o'$ is linear or branched $C_{2-4}$alkylene, and
each a is independently 2 or 3,
wherein
each $R_5''$ is independently hydrogen or methyl,
each $R_7'$ is independently methyl or ethyl, and
each $Z_2$ is independently $-NR_{11}''R_{12}''$ or $-N^{\oplus}R_{13}''R_{14}''R_{15}''$ $A^{\ominus}$,
wherein
each $R_{11}''$ and $R_{12}''$ is independently hydrogen, methyl or ethyl, or
$-NR_{11}''R_{12}''$ is morpholino, piperazino or N-methylpiperazino,
each $R_{13}''$ and $R_{14}''$ is independently methyl or ethyl, and
each $R_{15}''$ is independently methyl, ethyl or benzyl, or
$-N^{\oplus}R_{13}''R_{14}''R_{15}''$ is pyridinium, 2-picolinium, 3-picolinium, N-methylmorpholinium, N-methylpiperidinium, N-methylpiperazinium or N,N'-dimethylpiperazinium.

10. A composition matter according to claim 9 which is a metal-free compound or a salt thereof, a mixture of metal-free compounds or salts or a mixture of metal-free compounds and salts.

11. A composition of matter according to claim 9 which is (i) a metal-free compound of the formula

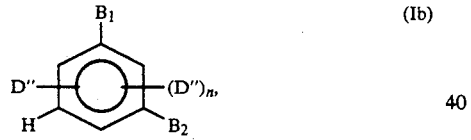

(Ib)

or a salt thereof, (ii) a 1:1 metal complex of a metallizable compound of Formula Ib, or a salt thereof, (iii) a 1:2 metal complex of a metallizable compound of Formula Ib, or a salt thereof, (iv) a 1:2 metal comples of two metallizable compounds of Formula Ib, or a salt thereof, (v) a 1:2 metal complex of a metallizable compound of Formula Ib and a metallizable compound not of Formula Ib, or a salt thereof or (vi) a mixture thereof, wherein
each D'' is independently

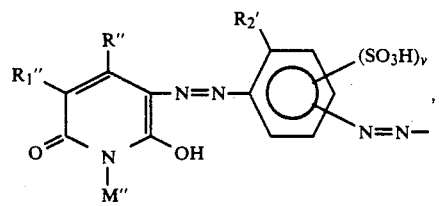

wherein
R'' is methyl or phenyl, $R_1''$ is hydrogen, cyano or

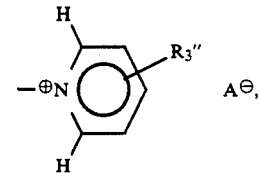

wherein $R_3''$ is hydrogen or methyl, and
M'' is methyl, ethyl, benzyl,
$-(CH_2)_2-NR_{13}''R_{14}''$, $-(CH_2)_3-NR_{13}''R_{14}''$,
$-(CH_2)_2N^{\oplus}R_{13}''R_{14}''R_{15}''$ $A^{\ominus}$
$-(CH_2)_3N^{\oplus}R_{13}''R_{14}''R_{15}''$ $A^{\ominus}$ or

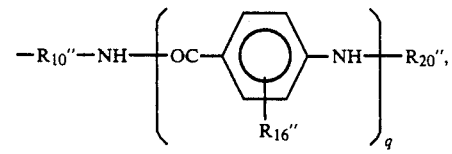

wherein
$R_{10}''$ is 1,2-ethylene, 1,3-propylene, m-phenylene or p-phenylene,
$R_{16}''$ is hydrogen, chloro or methyl, and
$R_{20}''$ is hydrogen, $-CO-CH_2-Z_2$ or

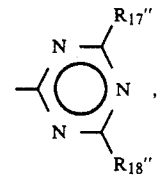

wherein
$R_{17}''$ is chloro, hydroxy, methoxy, amino, $C_{1-2}$alkylamino, $C_{2-4}$hydroxyalkylamino, N,N-di-($C_{2-4}$hydroxyalkyl)amino, $-NR_5''R_{19}'$,

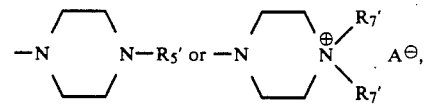

and $R_{18}''$ is $-NR_5''R_{19}'$.

12. A composition of matter according to claim 11 which is a metal-free compound or a salt thereof, a mixture of metal-free compounds or salts or a mixture of metal-free compounds and salts.

13. A composition of matter according to claim 12 which is a salt of the formula or a mixture of salts comprising the salt of the formula

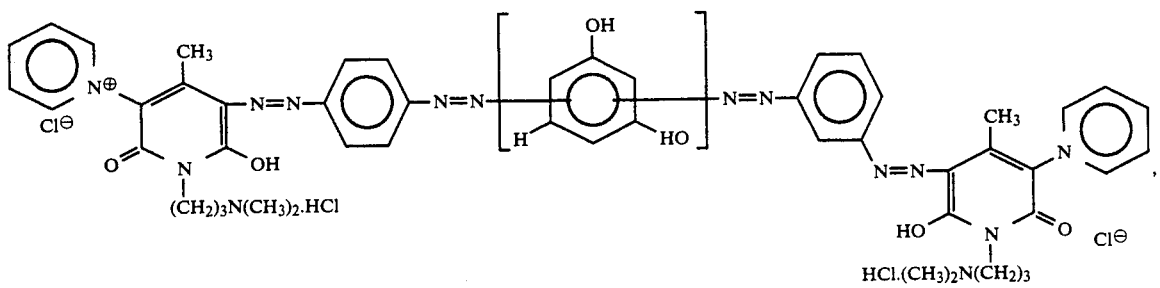

or a mixture thereof.

14. A composition of matter according to claim 13 which is a salt of the formula

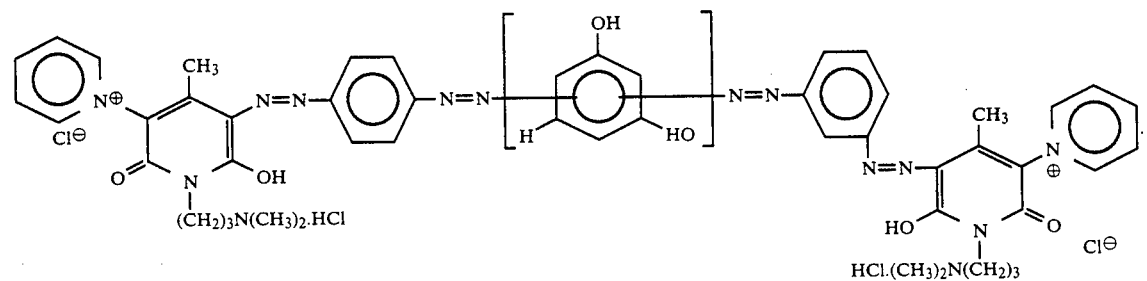

15. A composition of matter according to claim 13 which is a mixture of salts comprising the salt of the formula

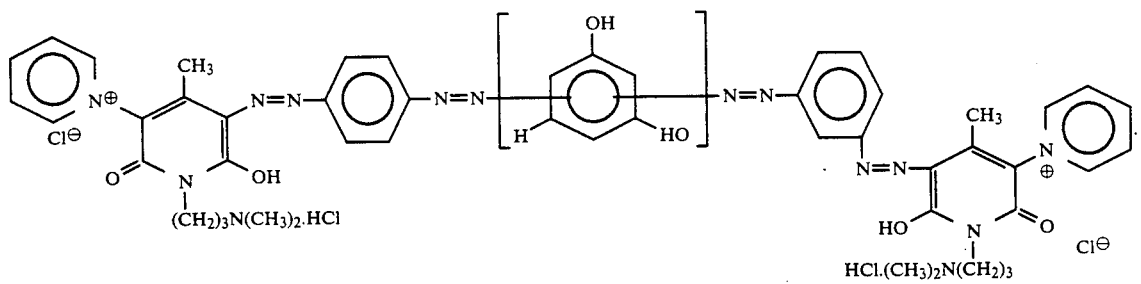

or a salt thereof, a mixture of such metal complexes or salts or a mixture of such metal complexes and salts, wherein

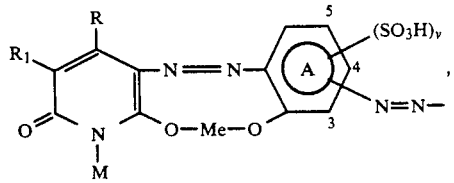

wherein
Me is copper, chromium, cobalt, nickel or manganese, and
the floating azo radical on Ring A is in the 3-, 4- or 5-position thereof.

17. A composition of matter according to claim 1 which is a 1:1 metal complex of the formula 16. A composition of matter according to claim 1 which is a 1:1 metal complex of the formula

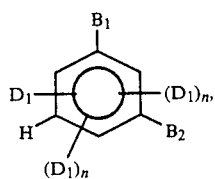

each $D_1$ is independently

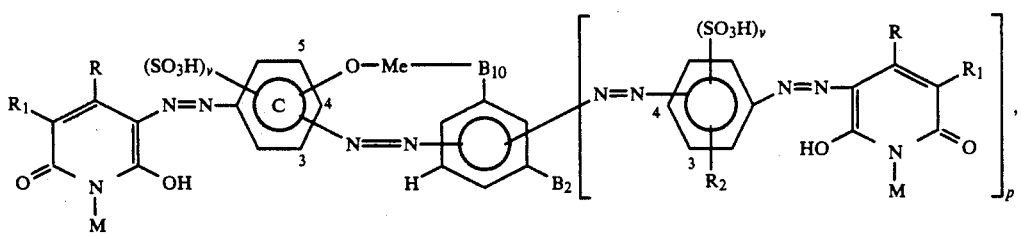

a salt thereof, a mixture of such metal complexes or salts or a mixture of such metal complexes and salts wherein $B_{10}$ is —O— or —NH—, Me is copper, chromium, cobalt, nickel or manganese, the floating oxy radical attached to Ring C is in the 3- or 4-position and is ortho to the floating azo radical attached to said ring, and p is 0, 1 or 2.

18. A composition of matter according to claim 1 which is a 1:1 metal complex of the formula

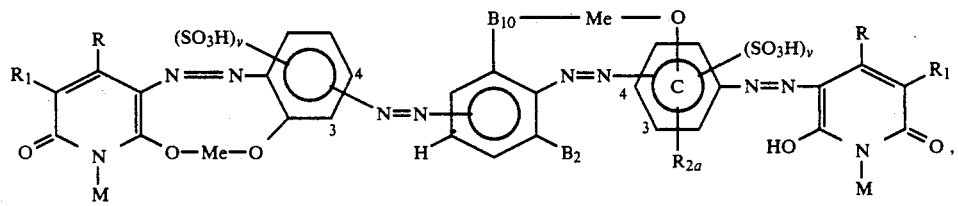

or a salt thereof, a mixture of such metal complexes or salts or a mixture of such metal complexes and salts, wherein $B_{10}$ is —O— or —NH—, each Me is independently copper, chromium, cobalt, nickel or manganese, and the floating oxy radical attached to Ring C is in the 3- or 4-position thereof and is ortho to the floating azo radical attached to said ring.

19. A composition of matter according to claim 1 which is (i) a 1:2 chromium, cobalt or iron complex of a metallizable compound of Formula I, or a salt thereof, (ii) a 1:2 chromium, cobalt or iron complex of two metallizable compounds of Formula I, or a salt thereof, (iii) a 1:2 chromium, cobalt or iron complex of a metallizable compound of Formula I and a metallizable compound not of Formula I, or a salt thereof or (iv) a mixture thereof.

* * * * *